US007818420B1

(12) United States Patent  (10) Patent No.: US 7,818,420 B1
Taylor                    (45) Date of Patent:    Oct. 19, 2010

(54) SYSTEM AND METHOD FOR AUTOMATIC REMOTE NOTIFICATION AT PREDETERMINED TIMES OR EVENTS

(75) Inventor: Michael W. Taylor, Las Cruces, NM (US)

(73) Assignee: Celeste Ann Taylor, Las Cruces, NM (US)

( * ) Notice: Subject to any disclaimer, the term of this patent is extended or adjusted under 35 U.S.C. 154(b) by 411 days.

(21) Appl. No.: 11/845,034

(22) Filed: Aug. 24, 2007

(51) Int. Cl.
G06F 15/173 (2006.01)
G06F 15/16 (2006.01)

(52) U.S. Cl. .................. 709/224; 709/207; 709/223

(58) Field of Classification Search ......... 709/223–224, 709/217–219, 207
See application file for complete search history.

(56) References Cited

U.S. PATENT DOCUMENTS

| 3,906,166 | A |   | 9/1975  | Cooper et al. |
| 3,999,050 | A |   | 12/1976 | Pitroda |
| 4,242,539 | A |   | 12/1980 | Hashimoto |
| 4,692,941 | A |   | 9/1987  | Jacks et al. |
| 4,783,803 | A |   | 11/1988 | Baker et al. |
| 5,519,859 | A |   | 5/1996  | Grace |
| 5,963,951 | A | * | 10/1999 | Collins ............................ 1/1 |
| 6,173,259 | B1|   | 1/2001  | Bijl et al. |
| 6,351,271 | B1|   | 2/2002  | Mainwaring et al. |
| 6,363,352 | B1| * | 3/2002  | Dailey et al. .................. 705/9 |
| 6,442,018 | B1|   | 8/2002  | Dinkin |
| 6,665,389 | B1| * | 12/2003 | Haste, III ..................... 379/196 |
| 7,188,153 | B2|   | 3/2007  | Lunt et al. |
| 2002/0107927 | A1 | * | 8/2002 | Gallant ....................... 709/206 |
| 2004/0122810 | A1 | * | 6/2004 | Mayer .......................... 707/3 |
| 2005/0086211 | A1 | * | 4/2005 | Mayer .......................... 707/3 |
| 2006/0036457 | A1 | * | 2/2006 | McNamara ..................... 705/1 |
| 2007/0001125 | A1 |   | 1/2007 | Taylor |
| 2007/0266033 | A1 | * | 11/2007 | Kelly .......................... 707/10 |
| 2008/0140681 | A1 | * | 6/2008 | Ajibade ....................... 707/100 |

OTHER PUBLICATIONS

Eustice, K. F., "A universal information appliance", "IBM Systems Journal—Pervasive Computing", No. 4, 1999, pp. 1-20, vol. 38, Publisher: web address = http://www.research.ibm.com/journal/sj/384/eustice.html.

Parsons, Bob, "Why the internet can be a bad place to meet people. A murder in Virginia. The Taylor Behl story.", "web address: http://www.bobparsons.com/WhytheinternetcanbeabadplacetomeetpeopleAmurderinVirginiaTheTaylorBehlstory.html", Oct. 12, 2005.

* cited by examiner

*Primary Examiner*—Hussein A Elchanti
(74) *Attorney, Agent, or Firm*—Charles A. Lemaire; Jonathan M. Rixen; Lemaire Patent Law Firm, P.L.L.C.

(57) ABSTRACT

The present invention provides a system and method for automatic remote notification that includes eliciting and receiving, into a server, triggering information from a client, wherein the triggering information includes specifications of a first communication to be sent, a destination for the first communication, and a first triggering event for sending the first communication, receiving arming information from the client and arming the sending of the first communication to be sent based on the triggering information, and conditionally sending the first communication from the server to the first destination based on occurrence of the first triggering event. The specification of the destination for the first communication includes an electronic address of a first communications device of a person, the specification of the first triggering event includes information that defines an amount of time, and the arming includes starting a timer that triggers upon elapse of the amount of time.

32 Claims, 19 Drawing Sheets

FIG. 4

SIGN IN PAGE

SaferHookUp

*Sign In*

User Name: testuser
Password: ********
☒ Remember Me

Submit

I Forgot Join

Welcome to SaferHookUp!

Howdy. As our website is new we are still testing the software. Please be patient if anything unexpected happens and send us some feedback, using the link at the bottom of the page, so we can fix it.

Thank you for your support!

Home : About Us : Advertise Here : Contact Us : Terms of Service : Help : Give Feedback Website Copyright and Trademark Notice

ADD NEW FRIEND PAGE

SaferHookup

Home | OUT - Meet HookUp | IM - Return Home | Manage Hookups | Manage Friends | My Account | Help | Sign Out

*Manage Friends - Add New Friend*

Last Name   First Name

Email (Used to Activate Account)
Retype Email

Phone Number (Optional)

☒ Send my friend a reminder email letting them know I use Safer Hookup.

Submit   Cancel

Home | About Us | Advertise Here | Contact Us | Terms of Service | Help | Give Feedback Website Copyright and Trademark Notice

*FIG. 8*

MANAGE FRIENDS – FRIEND ADDED

SaferHookUp

Home | OUT - Meet HookUp | IM - Return Home | Manage Hookups | Manage Friends | My Account | Help | Sign Out

Manage Friends

Add New Friend

| Name | Email | Phone | | |
|------|-------|-------|------|--------|
| John Doe | johnDoe@3xID.com | 5055551212 | Edit | Delete |

Home | About Us | Advertise Here | Contact Us | Terms of Service | Help | Give Feedback Website Copyright and Trademark Notice

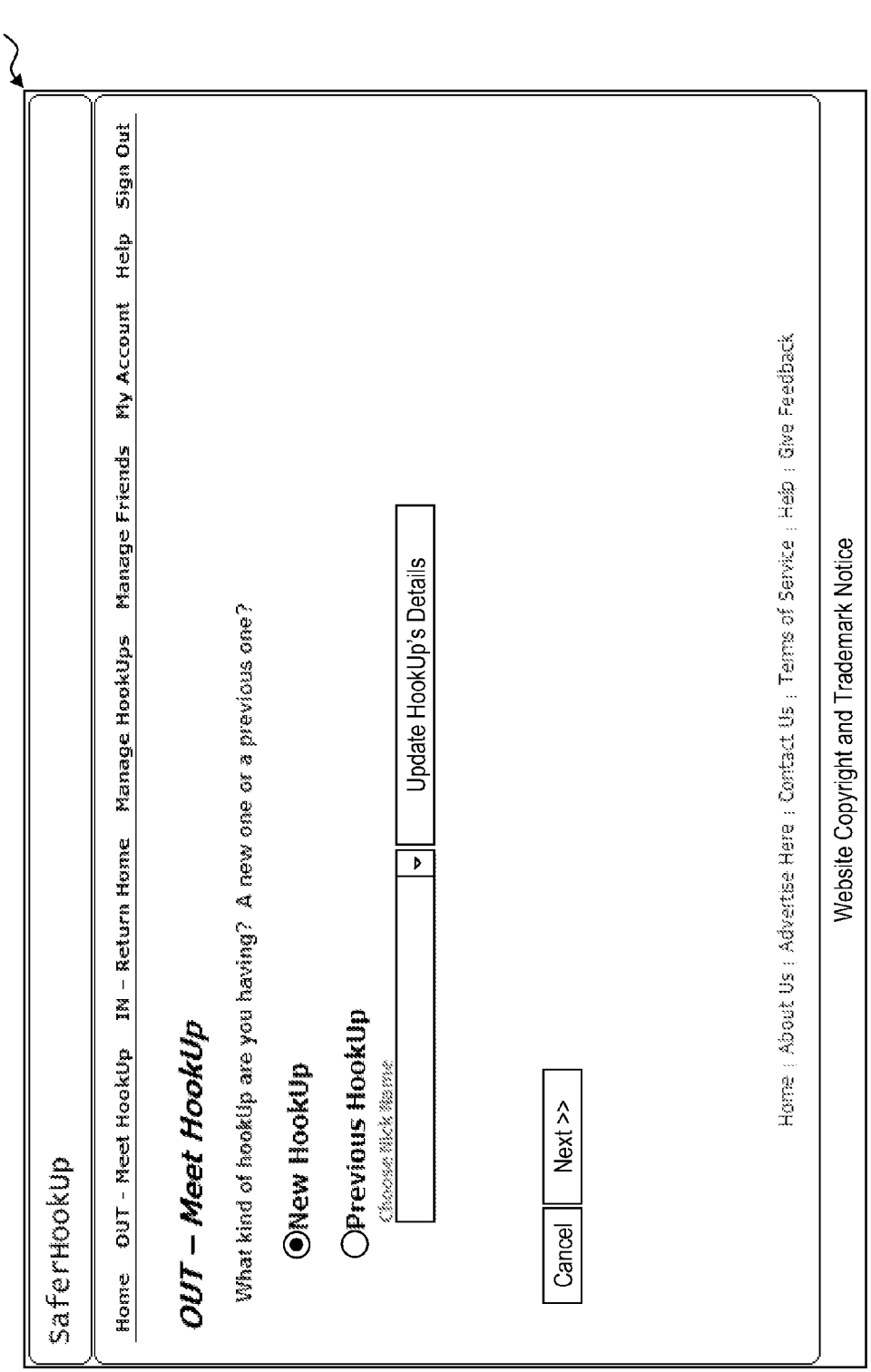

*FIG. 10*

SaferHookUp

Home | OUT – Meet HookUp | IM – Return Home | Manage HookUps | Manage Friends | My Account | Help | Sign Out Email (Used to Activate Account)   Retype Email
OUT – MEET HOOKUP PAGE – NEW HOOKUP DETAILS

OUT – Meet New HookUp

Nick Name    Screen Name    First Name    Last Name
Test HookUp

Where Did You Meet?    Physical Stats    Email    Phone Number

Address    Apt. #    City    State    Zip

Chat Log (Paste the Whole Thing Here)    Notes

[ Cancel ]  [ Next >> ]

Home | About Us | Advertise Here | Contact Us | Terms of Service | Help | Give Feedback Website Copyright and Trademark Notice

FIG. 11  OUT – MEET HOOKUP PAGE – NEW HOOKUP DURATION

1100

SaferHookUp

Home | OUT - Meet HookUp | IN – Return Home | Manage HookUps | Manage Friends | My Account | Help | Sign Out

*OUT – Meet HookUp*

HookUp Nick Name
Test HookUp

How Long Should It Take
[ 2 ½ Hours ▾ ]

Instant Notification
☒ Tell my friends right now that I am hooking up.
Friends are automatically notified when you check back in.

[ Cancel ]  [ Finish ]

Home | About Us | Advertise Here | Contact Us | Terms of Service | Help | Give Feedback Website Copyright and Trademark Notice

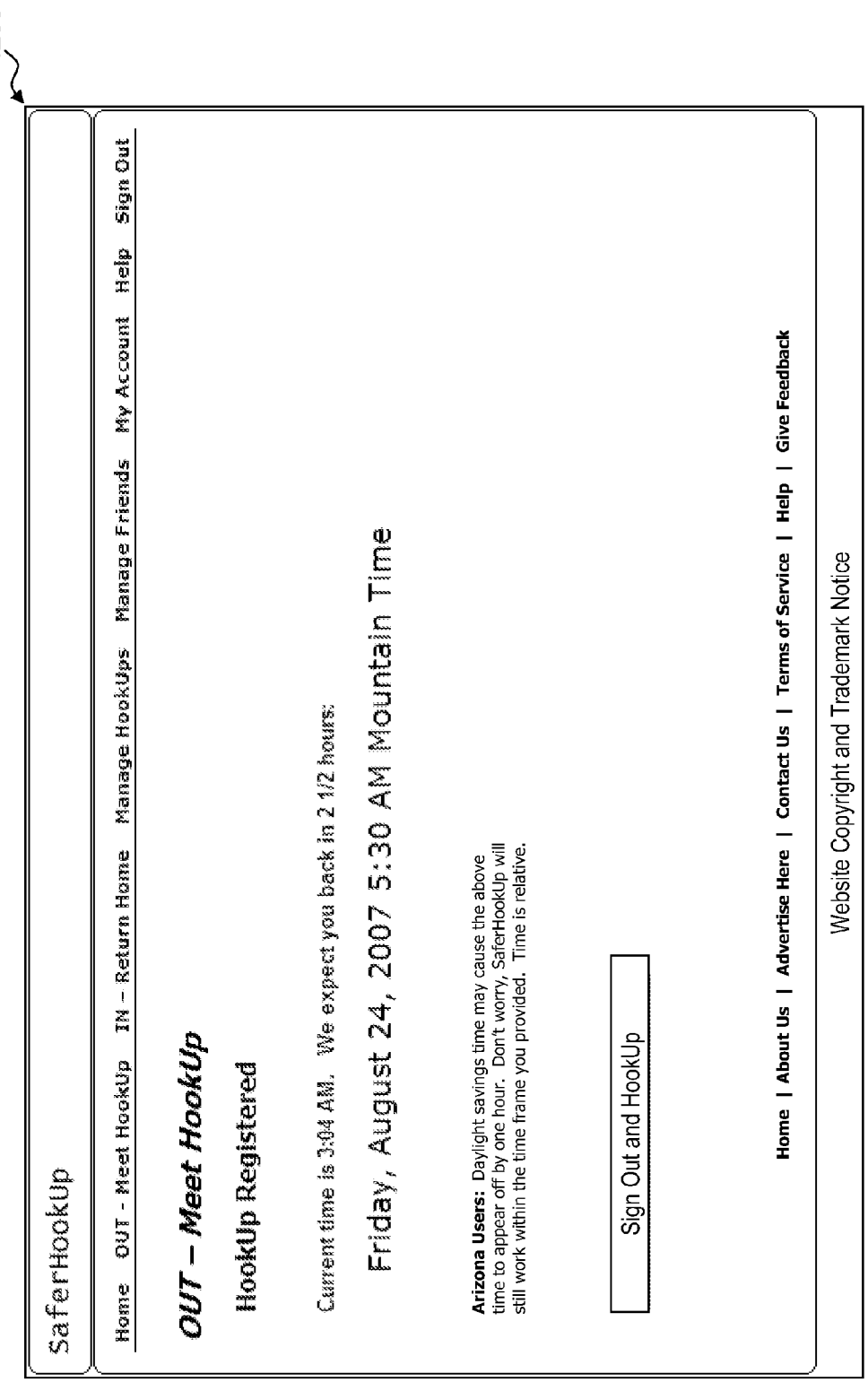
FIG. 12    OUT – MEET HOOKUP PAGE – NEW HOOKUP REGISTRATION CONFIRMATION

FIG. 13

IN – RETURN HOME PAGE

SaferHookup

Home | OUT – Meet HookUp | IN – Return Home | Manage HookUps | Manage Friends | My Account | Help | Sign Out

*IN – Return Home*

| Nick Name | HookUp Status | Expected HookUp Return Time | |
|---|---|---|---|
| Test HookUp | In Progress | Friday, August 24, 2007 5:30 AM | Check In |

Home : About Us : Advertise Here : Contact Us : Terms of Service : Help : Give Feedback Website Copyright and Trademark Notice

*FIG. 16*   EDIT EXISTING HOOKUP

SaferHookUp

Home | OUT - Meet HookUp | IN - Return Home | Manage HookUps | Manage Friends | My Account | Help | Sign Out

Manage HookUps - Edit

Nick Name    Screen Name    First Name    Last Name
Test HookUp

Where Did You Meet?    Physical Stats    Email    Phone Number

Address    Apt. #    City    State    Zip

Chat Log (Paste the Whole Thing Here)    Notes

Submit  Cancel

Home | About Us | Advertise Here | Contact Us | Terms of Service | Help | Give Feedback Website Copyright and Trademark Notice

FIG. 17 OUT – MEET HOOKUP PAGE – PREVIOUS HOOKUP

SaferHookUp

Home   OUT – Meet HookUp   IN – Return Home   Manage HookUps   Manage Friends   My Account   Help   Sign Out

OUT – Meet HookUp

What kind of hookUp are you having? A new one or a previous one?

○ New HookUp
⦿ Previous HookUp
Choose Nick Name:

| Test HookUp ▾ |   | Update HookUp's Details |

| Cancel |   | Next >> |

Home ¦ About Us ¦ Advertise Here ¦ Contact Us ¦ Terms of Service ¦ Help ¦ Give Feedback Website Copyright and Trademark Notice

1700

SYSTEM AND METHOD FOR AUTOMATIC REMOTE NOTIFICATION AT PREDETERMINED TIMES OR EVENTS

FIELD OF THE INVENTIONS

The invention relates generally to a communications system, and more particularly to a system and method for automatically communicating with one or more destinations based upon triggering information that is elicited and received from a client.

BACKGROUND OF THE INVENTION

With the creation of the Internet and an ever increasing number of people who are able to access the Internet from an ever increasing number of places such as work, home, laptop, mobile cellular phone, and personal desktop assistant (PDA), people have also created new methods to communicate with each other using these new technologies (see U.S. Pat. Nos. 6,442,018, which describes the laptop computer, 3,906,166, which describes the mobile cellular phone, and 3,999,050, which describes the personal desktop assistant; all of these patents are herein incorporated by reference in their entirety).

One example of a new communication method is online chatting (i.e. the use of online chat rooms). Known technically as "synchronous conferencing," online chatting allows people to meet others and communicate via typing messages to one another publicly and privately. (see U.S. Pat. No. 6,351,271, which describes a method and apparatus for sending and receiving lightweight messages or synchronous conferencing, herein incorporated by reference in its entirety).

Varies websites currently exist on the Internet where the ability for individuals to post various items of personal information for others to view, for the purpose of social interaction have been created. For example, see the following representative, but not exhaustive, list of http-type websites: www.myspace.com, www.eharmony.com, www.facebook.com, www.match.com, and personals.yahoo.com.

These websites facilitate communication between individuals, known as, "social networking," by providing, among other things, a method for individuals to subscribe, provide personal information, known as a profile, and view other people's profiles along with the ability to instant message and email other subscribers. The concept of social networking is described in U.S. Pat. No. 7,188,153, which is herein incorporated by reference in its entirety.

The Internet is connecting people with each other by providing new methods for people to meet that previously did not exist. These introductions are far less encumbered by the traditional limitations placed upon people meeting in the past, such as having common friends. It appears now that any person with a profile has the means to introduce themselves to another person, with a profile, without the need of a traditional introduction. In addition to meeting and making on-line friends, people are now extending their virtual friendships into the real world meeting one other to engage in various social activities. As imagined, when strangers meet there is an element of risk assumed by both parties. Some of these dangers are addressed in the blog "Hot Points—A blog by Go Daddy CEO and founder Bob Parsons," within an article entitled "Why the Internet can be a bad place to meet people. A murder in Virginia. The Taylor Behl story," dated Oct. 12, 2005, the article herein incorporated by reference in its entirety.

What is needed is an automated and computerized method to mitigate the risks inherent in two strangers meeting (i.e. to increase the margin of safety when one individual meets another individual, or individuals, that are not well known).

SUMMARY OF THE INVENTION

The present invention provides a system and method for clients to meet a stranger, perhaps after meeting them using the Internet, and leave a record of the meeting in a computer database. In some embodiments, if the client does not return within the specified time, the system automatically notifies friends of the client that the client is missing.

In some embodiments, the present invention provides a computerized method for automatic remote notification that includes eliciting and receiving, into a server, triggering information from a client, wherein the triggering information includes specifications of a first communication to be sent, a first destination for the first communication, and a first triggering event for sending the first communication, receiving arming information from the client and arming the sending of the first communication to be sent based on the triggering information, and conditionally sending the first communication from the server to the first destination based on occurrence of the first triggering event.

In some embodiments, the present invention provides an apparatus for automatic remote notification that includes a server, wherein the server is operatively coupled to an Internet, an information database operatively coupled to the server, a trigger module operatively coupled to the information database, wherein the trigger module is configured to elicit and receive triggering information from a client over the Internet, wherein the trigger module is configured to store the triggering information to the information database, and wherein the triggering information includes specifications of a first communication to be sent, a first destination for the first communication, and a first triggering event for sending the first communication, an arm module operatively coupled to the information database, wherein the arm module is configured to receive arming information related to the triggering information from the client, wherein the arm module is configured to store the received arming information to the information database, and wherein the arm module is configured to arm the sending of the first communication to be sent based on the triggering information, and a communications unit operatively coupled to the information database, wherein the communications unit is configured to conditionally send the first communication from the server to the first destination based on occurrence of the first triggering event.

In some embodiments, the present invention provides a computer-readable medium having computer-executable instructions stored thereon for causing a suitably-programmed information processor to perform a method that includes eliciting and receiving, into a server, triggering information from a client, wherein the triggering information includes specifications of a first communication to be sent, a first destination for the first communication, and a first triggering event for sending the first communication, receiving arming information from the client and arming the sending of the first communication to be sent based on the triggering information, and conditionally sending the first communication from the server to the first destination based on occurrence of the first triggering event.

BRIEF DESCRIPTION OF THE DRAWINGS

FIG. 4 is a screen shot of a SIGN IN PAGE 400 of some embodiments.

FIG. 7 is a screen shot of an ADD NEW FRIEND PAGE 700 of some embodiments.

FIG. 8 is a screen shot of a MANAGE FRIENDS—FRIEND ADDED screen 800 of some embodiments.

FIG. 9 is a screen shot of an OUT—MEET HOOKUP PAGE—NEW HOOKUP screen 900 of some embodiments.

FIG. 10 is a screen shot of an OUT—MEET HOOKUP PAGE—NEW HOOKUP DETAILS PAGE 1000 of some embodiments.

FIG. 11 is a screen shot of an OUT—MEET HOOKUP PAGE—NEW HOOKUP DURATION screen 1100 of some embodiments.

FIG. 12 is a screen shot of an OUT—MEET HOOKUP PAGE—NEW HOOKUP REGISTRATION CONFIRMATION screen 1200 of some embodiments.

FIG. 13 is a screen shot of an IN—RETURN HOME PAGE 1300 of some embodiments.

FIG. 16 is a screen shot of an EDIT EXISTING HOOKUP screen 1600 of some embodiments.

FIG. 17 is a screen shot of an OUT—MEET HOOKUP PAGE—PREVIOUS HOOKUP screen 1700 of some embodiments.

DESCRIPTION OF EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1:
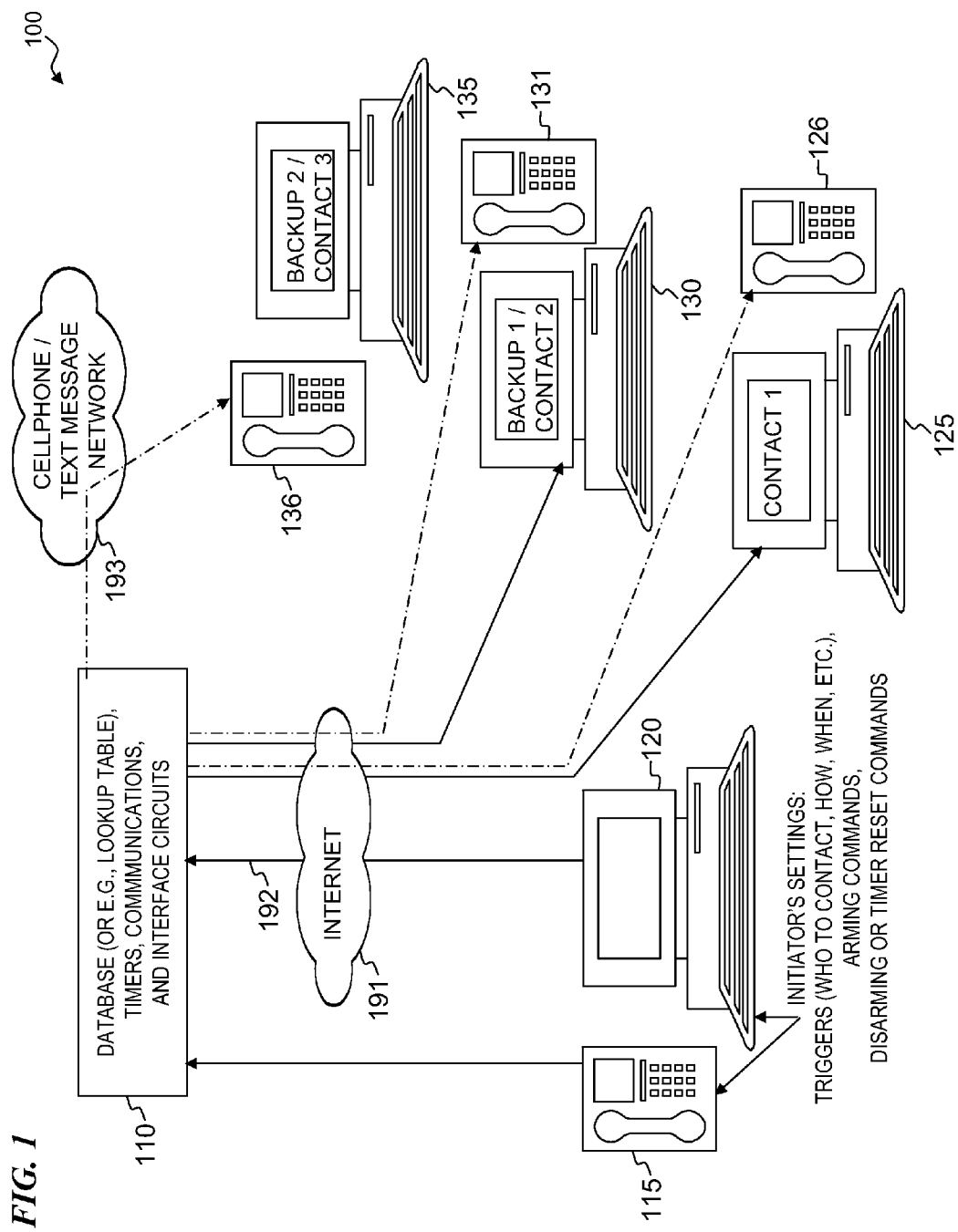
FIG. 1 is a block diagram of a system 100 of the present invention.

FIG. 1 is a block diagram of a system 100 of the present invention. In some embodiments, the present invention provides a system and method for allowing an individual, known herein as the "Client," to register with a website service which provides an information database 110 that elicits and receives certain information from the Client such as, for example, a unique user name, a password, first name, last name, physical address including city state and zip code, cell phone number, relationship status, and time zone. This Client information is known herein as the "Account." In some embodiments, the amount of information provided by the Client for the Account is at the discretion of the Client. In some embodiments, the Client is a paid subscriber to the website service. In some embodiments, the subscription to the website service is for a specified amount of time (e.g., one month, six months, one year, etc.). In some embodiments, the subscription to the website service is a pay-per-use subscription.

In some embodiments, the information database 110 interacts with the Client through a website interface to elicit, receive, and store the Account and other information. In some embodiments, for example, the information database 110 is operatively connected to a server, which is connected to an Internet 191 via an Internet connection 192, and the server communicates with a Client's personal computing device 120 that is also connected to the Internet 191. In some embodiments, the information database 110 elicits and receives the Account directly from the Client via a communications device 115. In some embodiments, the communications device 115 is a telephone or other voice communication device. In some embodiments, the communications device 115 is a cellular phone or other mobile communication device that includes text messaging.

In some embodiments, the information database 110 further elicits and receives triggering event information from the Client, which forms the basis for setting off an alarm. In some embodiments, for example, the triggering event is based on an elapsed amount of time, and therefore the triggering event information includes the amount of time desired to elapse before the alarm is set off. In some embodiments, the triggering event occurs when the information database 110 fails to receive a communication from the Client within an elapsed amount of time. In some embodiments, the triggering event is the occurrence of an event or action. For example, in some embodiments, the triggering event is the receipt of a communication from the Client. In other embodiments, for example, the triggering event is the occurrence of a burglary in the Client's home.

In some embodiments, the triggering event information includes one or more preset destinations which receive a communication 193 from the information database 110 in the event the alarm is triggered. In some embodiments, the one or more preset destinations include persons that the Client has provided contact information about to the information database 110. In some embodiments, for example, the one or more preset destinations include a first contact 125, a second contact/first backup 130, and a third contact/second backup 135. In other words, in some embodiments, the information database 110 elicits and receives from the Client that the first contact 125 should be given a communication first, and if the information database 110 does not receive a disarming communication (see discussion below) from the Client within a certain amount of time after sending the first contact 125 a communication, then the information database 110 delivers a communication to the second contact/first backup 130. Further, in some embodiments, if the information database 110 does not receive a disarming communication from the Client within a certain amount of time after sending the second contact 130 a communication, then the information database 110 sends a communication to the third contact/second backup 135. In some embodiments, for example, the first contact 125 is a friend, the second contact 130 is a relative, and the third contact 135 is an emergency first-responder (e.g., the police).

In some embodiments, the triggering event information includes the content of the communication. In some embodiments, the triggering event information is sent to the information database 110 via the communications device 115. In some embodiments, the triggering event information is sent to the information database 110 over the Internet 191 via an online instant messaging service (e.g., AOL Instant Messenger®). In some embodiments, the Client's personal computing device 120 operates the online instant messaging service.

In some embodiments, the alarm must be armed by the Client before it can react to a triggering event. For example, in the case of an elapsed-time triggering event, time does not begin to elapse for the alarm until the Client arms the alarm. In some embodiments, arming is performed via the Internet 191. In some embodiments, arming is performed using the communications device 115. In some embodiments, arming is performed over the Internet 191 via an online instant messaging service (e.g., AOL Instant Messenger®). In some embodiments, the Client's personal computing device 120 operates the online instant messaging service. In some embodiments, a single arming process is used to set a plurality of different alarms.

In some embodiments, when the alarm is triggered by the triggering event, the information database 110 commences a plurality of functions. In some embodiments, the plurality of functions includes automatically sending the one or more communications to the one or more preset destinations. In some embodiments, the one or more communications are sent to communications devices used by the one or more preset destinations (e.g., communications devices 126, 131, and/or 136). In some embodiments, the one or more communications are sent over a cellphone/text message network 193. In some embodiments, the one or more communications are sent through the Internet 191 to the one or more destinations (e.g., first contact 125, second contact 130, and/or third contact 135).

In some embodiments, the present invention includes a disarming function, wherein the Client must disarm the alarm in order to prevent the alarm from going off. Similarly, in some embodiments, in order to prevent the information database 110 from sending a communication to emergency personnel (e.g., police, fire, ambulance, etc.), the Client must disarm the alarm within a certain amount of time after it has been set off.

In some embodiments, the alarm is incrementally extended by the Client. For example, in some embodiments, in the case of an elapsed-time triggering event, the Client decides that the initial time frame provided for the triggering event is too short and thus the information database 110 receives new triggering information that includes a new period of time to base the alarm on. This new triggering information is provided via a communication from the Client.

In some embodiments, the present invention is used for common, every-day reminders. For example, in some embodiments, the present invention is used to set an alarm that reminds the Client to water the lawn. In some embodiments, the present invention is used to set an alarm that reminds Client to turn off appliances such as ovens, stoves, grills, etc. In some embodiments, the present invention is used to set an alarm that reminds the Client to change the wash.

In some embodiments, the present invention is used to provide attorney docketing reminders. In some embodiments, for example, the present invention is used to remind the Client of court dates/times. In some embodiments, the present invention is used to remind the Client of filing deadlines.

In some embodiments, the present invention provides a system and method for providing natural disaster warnings.

In some embodiments, the system and method includes a plurality of sensors that can detect the existence of an impending natural disaster and deliver warnings to Clients that are in the path of the disaster. In some embodiments, therefore, information is elicited and received from Clients that wish to receive natural disaster warnings (including, to name a few, names, addresses, and payment information), and an alarm is set in which the triggering event is the existence of a given natural disaster. In some embodiments, if the alarm is triggered, a communication is sent out to all Clients within a danger zone of the impending natural disaster. In some embodiments, the danger zone is defined according to a plurality of factors including, for example, the type of natural disaster, the severity of the natural disaster, and information/warnings provided by various government entities including the National Weather Service.

In some embodiments, a system and method is provided that delivers warnings to Clients in the danger zone of an impending flash flood. In some embodiments, a system and method is provided that delivers warnings to Clients in the danger zone of a volcanic eruption. In some embodiments, a system and method is provided that delivers warnings to Clients in the danger zone of a meteor impact. In some embodiments, a system and method is provided that delivers warnings to Clients in the danger zone of a war. In some embodiments, a system and method is provided that delivers warnings to Clients in the danger zone of civil unrest. In some embodiments, a system and method is provided that delivers warnings to Clients in the danger zone of a disturbance of the peace. In some embodiments, a system and method is provided that delivers warnings to Clients in the danger zone of a tornado or hurricane. In some embodiments, the warnings are communicated to the Clients through email. In some embodiments, the warnings are communicated to the Clients through text messaging. In still other embodiments, the warnings are communicated to the Clients through Internet messaging such as AOL Instant Messenger®. In some embodiments, a system and method is provided that delivers notification to Clients within the vicinity of a celebrity, as defined by the Client or system. In some embodiments, a system and method is provided that delivers notification to Clients within the vicinity of an alcohol checkpoint. In some embodiments, a system and method is provided that delivers notification to Clients within the vicinity of congested traffic, current and future freeway construction, and/or any other information related to any delay or inconvenience regarding transportation.

In some embodiments, a single arming command includes a plurality of triggering events, including, for example, time-based triggering events (e.g., an elapse of a preselected amount of time), home security triggering events (e.g., the occurrence of a burglary), property damage triggering events (e.g., the occurrence of flooding in a home), and natural disaster triggering events (e.g., the occurrence of some type of natural disaster in the area where a Client is currently vacationing and/or residing and/or working). In some embodiments, a Client can observe an event, such as listed above, and trigger the events of another Client's, or group of Clients. In some embodiments, when a Client attempts to trigger the event of another Client, or group of Clients, the system will provide a mechanism for a trusted individual to verify the accuracy of the trigger's underlying cause. In other words, in some embodiments, the receipt of a single arming command causes the present invention to conditionally send one or more communications based on the occurrence of a plurality of triggering events. In some embodiments, the conditional sending of one or more communications based on the single arming command includes sending a communication to the Client, as well as to other trusted individuals of the Client (e.g., relatives, friends, co-workers, neighbors, etc.). In some embodiments, the conditional sending of a communication includes the sending of a "Cinderella reminder" to the Client, wherein the Cinderella reminder includes a reminder to the Client that the triggering event will occur in a certain amount of time (e.g., in some embodiments, in the case of a time-based triggering event, the Cinderella reminder reminds the Client about the triggering event five minutes (or other suitable and/or programmable amount of time) before the triggering event is to occur). In some embodiments, the Cinderella reminder includes an elicitation of a rearming command from the Client.

In some embodiments, the rearming information does not include any parameters. For example, in some embodiments, for a time-based triggering event, the receipt of rearming information automatically extends the time by a preset (non-user-selected) amount of time. In some embodiments, the rearming information includes user-specified parameters. For example, in some embodiments, for a time-based triggering event, the rearming information includes a user-specified amount of time in which to extend the triggering event.

Figure 2:
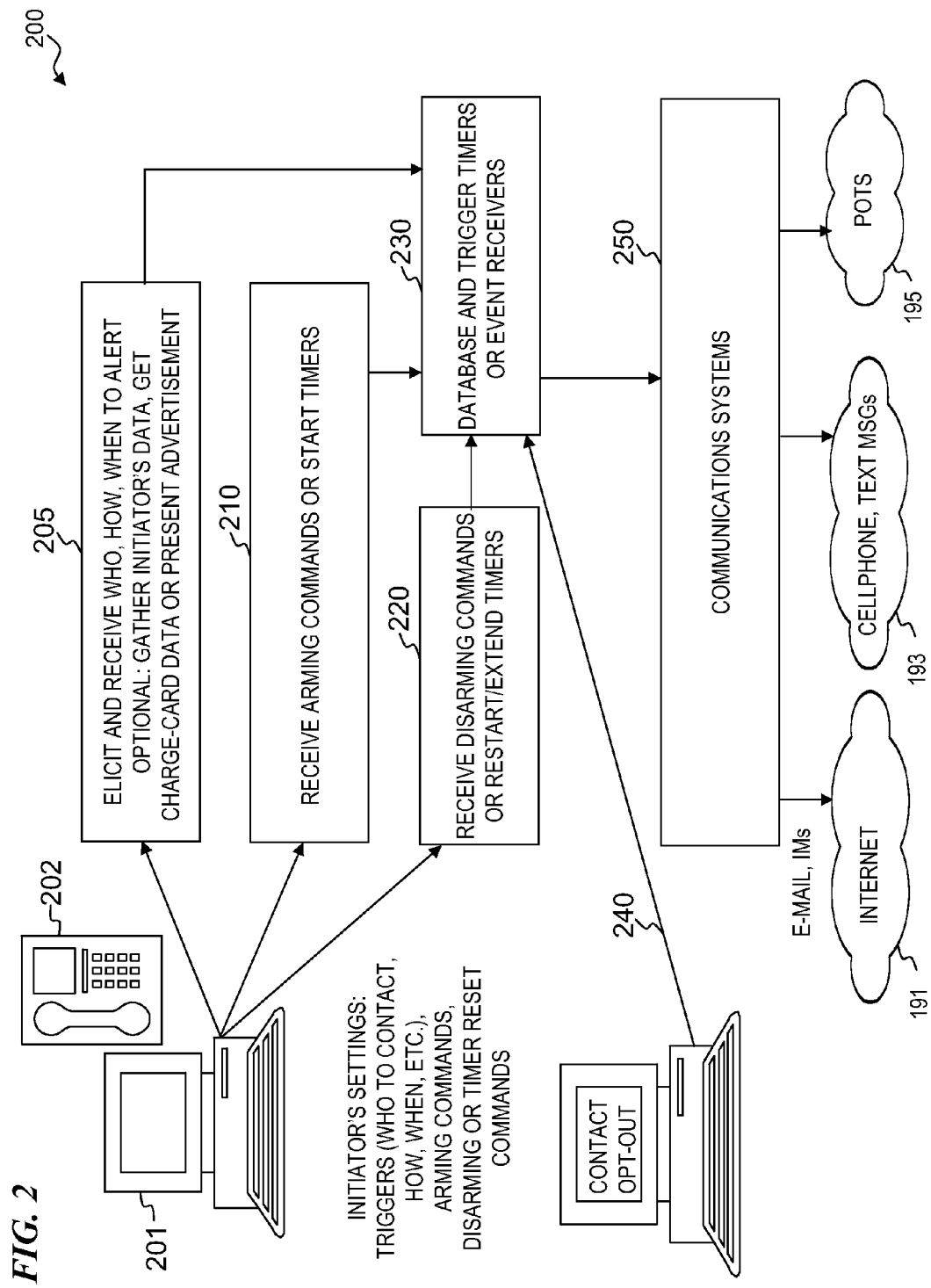
FIG. 2 is a block diagram of a system 200 of the present invention.

FIG. 2 is a block diagram of a system 200 of the present invention. In some embodiments, a server 201, which is operatively connected to the information database 110, performs the functions of the system 200. In some embodiments, the system 200 elicits and receives alert information 205 from the Client. In some embodiments, the information 205 includes alert destinations, how to alert, and when to alert. In some embodiments, the information 205 includes the Client's Account. In some embodiments, the information 205 includes the Client's charge-card or other payment-method data. In some embodiments, the system presents an advertisement to potential Clients, as well as current Clients and other individuals receiving communications from the mechanism.

In some embodiments, the system 200 receives arming commands or start timers 210 from the Client. In some embodiments, the system 200 receives disarming commands or restart/extend timers 220. In some embodiments, the system 200 receives contact opt-out information 240 from a communications destination. For example, in some embodiments, the system 200 elicits and receives approval information from a communications destination, and if the destination chooses not to participate in the system, the information database 110 receives contact opt-out information 240 from that destination. In some embodiments, the receipt of alert information 205, arming commands 210, disarming commands 220, and contact opt-out information 240 occurs via a communications device 202. In some embodiments, the communications device 202 includes a voice recording device. In some embodiments, the communications device 202 includes a cellular phone.

In some embodiments, the information database 110 uses the information 205, arming commands 210, and disarming commands 220 to create trigger timers/event receivers 230. In some embodiments, when an alert is triggered based on trigger timers/event receivers 230, the communications systems 250 are used to send communications to the one or more destinations designated by the Client. In some embodiments, the communications systems 250 send at least some of the communications over the Internet 191 via email or instant messaging. In some embodiments, the communications systems 250 send the communications over the cellphone/text message network 193. In still other embodiments, the communications systems 250 send at least some of the communications via POTS 195 (plain old telephone system).

Figure 3:
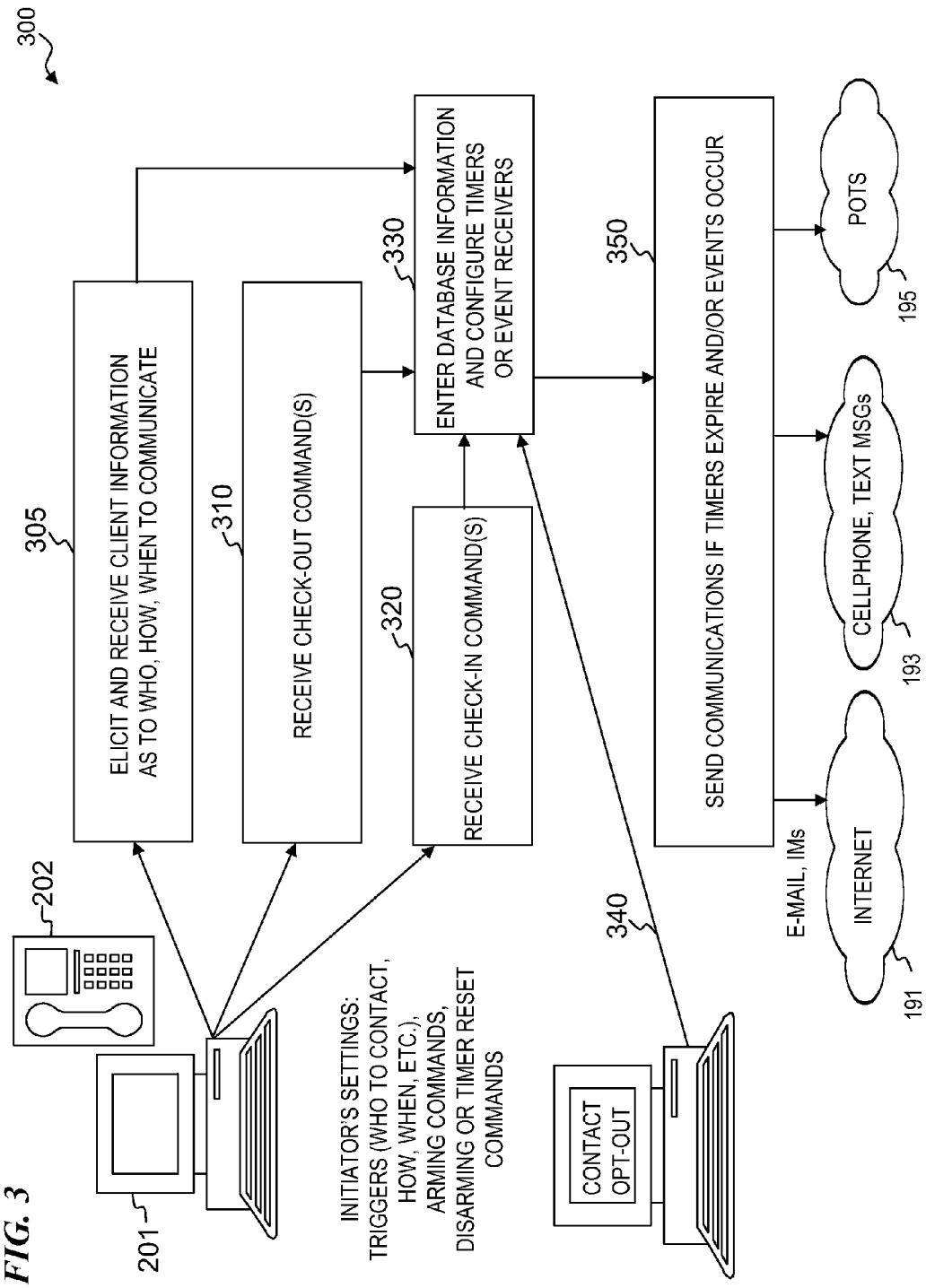
FIG. 3 is a block diagram of a system 300 of the present invention.

FIG. 3 is a block diagram of a system 300 of the present invention. In some embodiments, a server 201, which is operatively connected to the information database 110, performs the functions of the system 300. In some embodiments, the system 300 elicits and receives client information 305 from the Client. In some embodiments, the information 305 includes alert destinations, how to alert, and when to alert. In some embodiments, the information 305 includes the Client's Account. In some embodiments, the information 305 includes the Client's charge-card or other payment-method data. In some embodiments, the system presents an advertisement to potential Clients, as well as current Clients and other individuals receiving communications from the mechanism.

In some embodiments, the system 300 receives check-out commands 310 from the Client. In some embodiments, the system 300 receives check-in commands 320. In some embodiments, the system 300 receives contact opt-out information 340 from a communications destination. For example, in some embodiments, the system 300 elicits and receives approval information from a communications destination, and if the destination chooses not to participate in the system, the information database 110 receives contact opt-out information 340 from that destination. In some embodiments, the receipt of client information 305, check-in commands 310, check-out commands 320, and contact opt-out information 340 occurs via a communications device 202. In some embodiments, the communications device 202 includes a voice recording device. In some embodiments, the communications device 202 includes a cellular phone.

In some embodiments, the information 305, check-in commands 310, and check-out commands 320 are entered into the information database 110 to configure timers/event receivers 330. In some embodiments, when a communication is triggered based on timers/event receivers 330, the communications systems 350 are used to send communications to the one or more destinations designated by the Client. In some embodiments, the communications systems 350 send at least some of the communications over the Internet 191 via email or instant messaging. In some embodiments, the communications systems 350 send the communications over the cell phone/text message network 193. In still other embodiments, the communications systems 350 send at least some of the communications via POTS 195 (plain old telephone system).

In some embodiments of the present invention a computer client-server is utilized with an Ethernet connection to the Internet providing information services using the TCP/IP communication protocol, which is well known to those of skill in the art.

In some embodiments of the present invention a computerized database system is utilized to store and retrieve data. More specifically, a computerized database system is utilized that uses the structured query language, or more commonly know as SQL, to select, update, delete, and insert information for the purpose of data storage and retrieval (see U.S. Pat. No. 5,519,859, which describes SQL, and which is herein incorporated by reference in its entirety).

In some embodiments, the present invention provides a system and method to elicit and receive certain information from the Client regarding other, already known, and reasonably trusted, individuals of the Client, herein known as "Friends," such as, including but not limited to, first name, last name, email address, telephone number. In some embodiments, the amount of Friend information provided is at the discretion of the Client.

In some embodiments, Friends are contacted and given a choice whether they wish to participate as a Client's Friend or to fully opt out and not participate. Further, in some embodiments, Friends choose the degree of their participation. For example, in some embodiments, Friends choose to receive only certain communications, such as messages indicating an emergency or messages of an extremely urgent nature.

In some embodiments, a website interface is provided that elicits and receives certain information from the user regarding the person the Client plans to meet, known herein as the "Partner," including but not limited to, their alias name used on an Internet-meeting website (also known as their screen name), first name, last name, name of the facilitating website, known descriptive physical stats, email address, telephone number, physical address including city state and zip code, a copy of the full contents of any chat log, and other notes. In some embodiments, the amount of Partner information provided is at the discretion of the Client.

In some embodiments, a website interface is provided that elicits and receives certain information from the Client regarding the specific type of Partner they wish to meet. In some embodiments, the amount of Partner-type information provided is at the discretion of the Client.

In some embodiments, a website interface is provided that elicits and receives certain information from a Client regarding a near future meeting, herein known as a "Hookup," with the Partner, including but not limited to, the date and time the Hookup will begin, the date and time the Hookup will end, the location of the Hookup, the nature of the Hookup, and the Partner being met. In some embodiments, the moment when a Client specifies the details of a Hookup using the website interface and additionally specifies that the Hookup is commencing, the website logs the Client as engaging in a Hookup, known herein as "Checked Out."

In some embodiments, the Hookup is configured to commence at some point in the future rather than right away. In some embodiments, when a Client completes the Hookup and communicates that fact to the website, the Hookup changes from a Checked Out status to a status indicating that the Hookup has been terminated by the Client, herein known as "Checked In."

In some embodiments, when a Client is Checked Out and a period of time has elapsed past the designated Checked In time, the Hookup is categorized as late, herein known as "Overdue." During the period of time between the Checked Out time and the Overdue time, the Hookup is termed "In Progress." In summary, in some embodiments, the Client's status starts as Checked Out, changes to In Progress, and then, after a period of time, changes to either Checked In or Overdue.

In some embodiments, the Hookup information is referred to as triggering information, i.e., the information gathered from a Client as to (1) a message or other information to be communicated, (2) a destination to which the message is to be sent (e.g., a communications device such as the cell phone or Internet-connected computer of the Friend), and (3) a definition of a triggering event (e.g., that, unless the Check In is done before then, the communications is to be sent at three hours after the Checked Out time, or at midnight if Check Out is done before then, or some other event (whether temporal or other event, such as a sensor signal)). In some embodiments, the Check Out is referred to as arming the system (i.e., the communication will not be sent if the system is not armed to send it), and the Check In is referred to as disarming the system (i.e., the communication is not to be sent if the Client checks in before the expiration of the time period designated). In some embodiments, the occurrence of the Check In becoming Overdue is a triggering event (i.e. a communication is sent upon the Check In becoming Overdue), and in some embodiments, In Progress refers to the period of time between the arming of the system and the sending of the communication.

In some embodiments, Check Out is performed as a final part of entering Hookup information. In other embodiments, Check Out is performed as a separate and non-contiguous act done at a later time. In some such embodiments, Check Out is accomplished by a different communications device that communicates with the system of the invention (such as a cell phone call to a specific telephone number, followed by entering the Client's personal code, or by a similar text message sent by cell phone or Blackberry-type device, or by the Client's home security system as part of arming the security system, or the like).

In some embodiments, a single click on a remote-control device can perform multiple related departure and arming functions for different systems, for example: closing the garage door, turning off the lights of the residence, changing the temperature settings of the air conditioning system, arming the security system and sending a command to the system of the present invention to perform a Check Out operation, indicating that the Client has left his or her home. Similarly, in some embodiments, a single click on a remote-control device can perform multiple related return-arrival and disarming functions for different systems, for example: opening the garage door, turning on the lights of the residence, resetting the temperature settings of the air conditioning system, disarming the security system and sending a command to the system of the present invention to perform a Check In operation, indicating that the Client has safely arrived back at his or her home.

This allows, for example, the use of the present invention as a seamless addition to a security and/or monitoring service such as those provided by Brinks Home Security®, ADT®, Guardian Protection Services® and the like, wherein the present invention provides additional information to the security service, notifying them of whatever additional data that the Client desires, such as where the Client has gone, how long the Client expected to be away, whom to contact in case the Client did not return in the expected time or if a break-in or fire happened at the Client's home. In some embodiments, the present invention is used as at least one of the communications methods used to contact the security service to notify them of anything that night might have gone amiss, providing the Client with at least one "Friend" (i.e., a person at the security service) who is paid to be always available to take such calls from the system of present invention. This fills a here-to-for unmet need to augment a home or office security system by providing additional data (the Client's expected trip, who is being visited, how long a trip is expected to take, and the like) to a security service (who, without such information, only knows that perhaps the alarm system at home was activated, and an intrusion sensor was activated). Further, in some embodiments, the expected contact, location, and duration information is only provided to the security service in the event the Client Checked Out and did not Check In within the expected time, thus protecting the Client's privacy. In other embodiments, the system of the present invention is located at, and integrated with the other systems used by, the security service.

In some embodiments, the browser interface of the present invention is integrated with, and made a part of, a dating or hookup service such as www.myspace.com, www.eharmony.com, www.facebook.com, www.match.com, and personals.yahoo.com and the like, and/or a security or monitoring service such as Brinks Home Security®, ADT®, Guardian Protection Services® and the like, in order to provide a one-stop-shopping site. This provides a synergy not possible when such services are separately provided, i.e., the name, address, and other information about the other person whom the Client is expecting to meet (the Contact data) is, in some embodiments, transferred from the hookup service's database to the Check-Out and Check-in database of the present invention, and to the database of the security service, without having to enter that data multiple times or otherwise propagate the data. In some such embodiments, a single integrated database is used for two or more of the hookup, Check-Out and Check-in, and security services. Further, in some embodiments, a single click at a browser interface, a cell phone interface, or a security-system arming interface is used to both Check Out and arm the security system (the Check Out activating the present Check-out/Check-in invention to perform the specified communication to the specified destination upon occurrence of the specified event (such as the time period elapsing), and the arming of the security system enabling the alarms to sound and/or the call to the security service upon detection of intrusion or fire, and, in some embodiments, the additional communication to the security service that the Check In did not occur within the specified time).

In some embodiments, every temporal event listed above (Checked Out, Checked In, In Progress, Overdue), is monitored, logged, and causes the website system to commence an action. In some embodiments, an event that causes the website to commence an action is called a "Trigger." For example, in some embodiments, a specific amount of time lapsing after a Hookup is Overdue (e.g., ten, fifteen, twenty-five, or thirty-five minutes) is a Trigger. In other embodiments, a Trigger is not temporal in nature. For example, in some embodiments, a Trigger is set when a Client adds a new Friend or deletes an existing Friend.

In some embodiments, communication between Clients and the website, the website and Clients, Friends and the website, and the website and Friends, is known herein as a "Message." In some embodiments, Messages are facilitated using email, instant messaging, text messages sent via cellular telephone or other devices (herein known as "Texting"), and telephone voice messages (herein known as "Voicemail"), all of which is well known to those of skill in the art.

In some embodiments, the caller ID of a telephone utilized to send or receive a message is used as a means to authenticate the sender of the message (see U.S. Pat. No. 4,242,539, which describes caller ID, and which is herein incorporated by reference in its entirety).

In some embodiments, a Trigger is activated by an action of the Client. More specifically, in some embodiments, Messages activate Triggers. For example, in some embodiments, a Message from the Client asking for help causes the website to send a Message from the website to the police or other emergency personnel.

In some embodiments, Messages are sent using text to speech and speech to text technology (see U.S. Pat. Nos. 4,783,803 and 6,173,259, which describe speech to text, or speech recognition, and 4,692,941 which describes text to speech; all of these patents are herein incorporated by reference in their entirety).

In some embodiments, Messages include prerecorded audio messages. In some embodiments, for example, such a Message includes the communication "I should only be gone for two hours. If I don't return by tomorrow for some reason call my parents." In some embodiments, the receiver of a Message knows the audio message is authentic because the receiver recognizes the voice of the sender.

In some embodiments, a telephone system is used to provide all of the functionality of the website system described herein. In some embodiments, Clients use this phone system to call a telephone number and enter their password and user ID. In addition, in some embodiments, Clients use the phone system to perform functions such as Checked In, Checked Out, causing Triggers, defining Friends, and sending Messages.

In some embodiments, Clients use the above described telephone system to call a telephone number that automatically summons help in an emergency. More specifically, in some embodiments, a Client calling the phone system while on a Hookup automatically activates one or more emergency-summons Triggers. In some embodiments, the Triggers are activated despite the Client not saying anything or pressing any telephone keys.

In some embodiments, Clients predefine a Message to be played for the police in the event they are not Checked In after a predefined time period. In some embodiments, this emergency Message is screened by an employee of the service, or other trusted individual.

In some embodiments, Clients define the content of Messages sent in response to a Trigger. More specifically, in some embodiments, a Client defines a text message that reads, "I am on a Hookup and am one hour late. Please check on me in thirty more minutes." In other embodiments, the Client defines a Message to be delivered to one Friend if they are more than one hour Overdue, and a second Message to be delivered to all their Friends if they are more than three hours Overdue.

In some embodiments, mechanisms are put in place to avoid spam, otherwise known as unsolicited bulk email (see Unites States Patent Publication 2007/0011252, which describes spam, and which is herein incorporated by reference in its entirety). In some embodiments, all Messages have an associated monetary cost that must be paid by the sender before the Message is delivered. In some embodiments, certain Messages have a cost, such as emergency Messages. In addition, in some embodiments, Messages with custom defined content have a cost. In some embodiments the amount of cost to send a Message can randomly fall within a specific range of prices. In some embodiments the cost to send a Message can increase in the event a large number of Messages are sent within quick succession over a short period of time. In some embodiments, the cost of a Message is automatically charged to a credit card, debit card, checking account, or other money transfer means.

In some embodiments, Clients set Triggers that seek information from themselves. For example, in some embodiments, a Client sets a Trigger to alert themselves during a Hookup that there are only fifteen minutes left until Checked In time, and to request whether the Client wishes to extend the Checked In time.

In some embodiments, Clients communicate their Checked Out status using a message from the Client to the website. In some embodiments, Checked In times are extended using a message from the Client to the website. In some embodiments, Hookups are cancelled using a message from the Client to the website.

In some embodiments, a Java®, or other multiplatform API (Application Programming Interface) cell phone application is used to provide all of the above functionality of the website described herein. In some embodiments, a Java®, or other multiplatform API PDA application is used to provide all of the above functionality of the website described herein. In some embodiments, a Java®, or other multiplatform API application that is executed on any device that a Client can use to connect to the Internet is used to provide all of the above functionality of the website described herein (see article in IBM Systems Journal, Volume 38, Number 4, 1999, entitled "Pervasive Computing," which describes a "universal information appliance," and which is herein incorporated by reference in its entirety).

In some embodiments, the website is supported by selling and displaying advertising to Clients and Friends, while eliciting and receiving information and sending Messages.

In some embodiments, the present invention provided may be used for other purposes. For example, in some embodiments, a business woman goes to lunch with a customer and needs an excuse to break the meeting off early. In some embodiments, the business woman subscribes to the service, defines the meeting time of the lunch, and further defines a Trigger to call her cell phone at a prescribed time one hour into the lunch. In some embodiments, the present invention sends a text message to the business woman with a Message to return to the office immediately.

In some embodiments the present invention provides a method to remind Clients of their own Triggers. In some embodiments, for example, the present invention provides upcoming meeting reminders. In some embodiments, the present invention provides elegant docketing reminders (i.e. a specific calendar of deadlines and reminders of when an action needs to be taken). In some embodiments, such docketing reminders are used by attorneys and individuals in other professions. In other words, in some embodiments, the present invention is used by a Client to store a schedule, along with a corresponding set of reminders, and to set up Triggers based on the schedule that continuously send reminders to the Client and anyone else they choose until the Client disables the Triggers. In some embodiments, any number of communications methods are used to send the reminders including, for example, email, text messaging, and voicemail.

In some embodiments, the present invention provides a method for automatic remote notification that includes eliciting and receiving triggering information from a Client, setting up an alarm timer based on the triggering information, receiving arming information from the Client, conditionally starting the alarm timer based on the arming information, and automatically sending one or more communications to one or more Client contacts when the alarm timer goes off.

In some embodiments, the triggering event is based on an amount of time, wherein the amount of time is defined as the time period starting with an arming event and ending at a preselected time (e.g., twelve midnight). Therefore, in some embodiments, the time that elapses before the occurrence of the triggering event varies depending on when the Client chooses to send in arming information, and depending on the preselected time. For example, in some embodiments, where a Client selects a time of 1:00 A.M., but doesn't send in the arming information until 11:00 P.M., the amount of time that elapses before the occurrence of the triggering event is two hours. In other embodiments, the triggering event is based on an amount of time, wherein the amount of time is defined as the time period starting with an arming event and ending after a preselected amount of time has elapsed. For example, in some embodiments, where a Client selects an elapsed time period of three hours, and the Client sends in arming information at 8:00 P.M., the triggering event will occur at 11:00 P.M.

In some embodiments, the receiving of triggering information occurs within a first information transfer, and the receiving of arming information also occurs within the first information transfer. In other words, in some embodiments, the present invention receives both the triggering information and the arming information at one time as part of one operation. In some embodiments, the triggering information is received at a first time, and the arming information is received at a later, second time.

In some embodiments, the eliciting and receiving of triggering information includes eliciting and receiving one or more Client contacts. In some embodiments, the eliciting and receiving of one or more Client contacts includes eliciting and receiving approval responses from the one or more Client contacts. For example, in some embodiments, the eliciting and receiving of approval responses includes receiving contact opt-out information from the one or more Client contacts not interested in participating. In other words, in some embodiments, notification is received from a given Client contact that the contact does not want to be involved automatic remote messaging system. In some embodiments, the eliciting and receiving of approval responses includes receiving contact approval information from the one or more Client contacts.

In some embodiments, the eliciting and receiving of triggering information includes eliciting and receiving client payment information. In some embodiments, the client payment information includes client charge-card data. In some embodiments, the client payment information includes client bank account data. In some embodiments, the client payment information includes client debit card data.

In some embodiments, the present invention further includes receiving disarming information from the client, and conditionally modifying the alarm timer based on the disarming information. In some embodiments, the receiving of disarming information includes receiving a command to extend the alarm timer. In other embodiments, the receiving of disarming information includes receiving a command to disengage the alarm timer.

In some embodiments, the present invention provides an apparatus for automatic remote notification that includes a server, wherein the server is operatively coupled to an information database, and wherein the server is operatively coupled to an Internet network, a trigger module operatively coupled to the information database, wherein the trigger module elicits and receives triggering information from a Client over the Internet network, and wherein the trigger module stores the triggering information to the information database, an alarm unit operatively coupled to the information database, wherein the alarm unit sets up an alarm timer based on the triggering information, an arm module operatively coupled to the information database, wherein the arm module receives arming information from the Client over the Internet network, and wherein the arm module stores the arming information to the information database, an alarm starter operatively coupled to the information database, wherein the alarm starter conditionally starts the alarm timer based on the arming information, and a communications device operatively coupled to the information database, wherein the communications device automatically sends one or more communications to one or more Client contacts when the alarm timer goes off.

In some embodiments, the trigger module receives the triggering information within a first information transfer, and the arm module also receives the arming information within the first information transfer. In other words, in some embodiments, the present invention receives both the triggering information and the arming information at one time as part of one operation. In some embodiments, the triggering information is received at a first time, and the arming information is received at a later, second time.

In some embodiments, the triggering information received by the trigger module includes one or more Client contacts. In some embodiments, the trigger module elicits and receives approval responses from the one or more Client contacts. In some embodiments, the approval responses include contact opt-out information from the one or more Client contacts not interested in participating. In other words, in some embodiments, notification is received from a given Client contact that the contact does not want to be involved with the automatic remote messaging system. In some embodiments, the approval responses include contact approval information from the one or more Client contacts, wherein the contact approval information includes notification that the Client contact wants to be involved with the automatic remote messaging system.

In some embodiments, the triggering information received by the trigger module includes Client payment information. In some embodiments, the Client payment information includes Client charge-card data. In some embodiments, the Client payment information includes Client bank account data. In some embodiments, the Client payment information includes Client debit card data.

In some embodiments, the present invention further includes a disarm module operatively coupled to the information database, wherein the disarm module receives disarming information from the Client, and wherein the disarm module stores the disarming information to the information database, and an alarm modifier operatively coupled to the information database, wherein the alarm modifier conditionally modifies the alarm timer based on the disarming information. In some embodiments, the disarming information received by the disarm module includes a command to extend the alarm timer. In some embodiments, the disarming information received by the disarm module includes a command to disengage the alarm timer.

In some embodiments, the present invention provides a method that includes optionally collecting Client information (which may or may not allow the Client to be anonymous); defining one or more communications to be conditionally delivered and one or more destinations for the communication(s), and triggering event information that defines one or more event(s) that, if they occur, will trigger sending of the communication(s) to the destination(s) (in some embodiments, this includes inputting who is the person the Client plans to meet for a date—this defines who the Client plans to meet and/or where the Client is planning to go (e.g., if the date is arranged using Internet chat or similar communications, this could optionally include a chat log, and perhaps other optional information); checking out and or arming the triggered communications (in some embodiments, the Client can simultaneously (as with a single click, or a phone call or a text message) perform multiple checking out such that multiple trigger events are armed; the Client, after a successful and safe date can then come back and perform checking-in and/or disarming the triggering events (in some embodiments, the Client can simultaneously check-in all triggering events, or, in other embodiments, can check-in one at a time). In some embodiments, system can extract just certain non-personally identifiable information from the database (or can remove personally identifiable information from the database leaving just the non-personally identifiable information—optionally this can involve removing individually identifiable information after a period of time). This allows aggregating and/or sorting and searching data for generating reports, data mining, social research and the like.

In some embodiments, the present invention provides an interface to the aggregation database that elicits requests for various interrelated information (such as dating patterns), and generating reports as to social studies, humanities research and the like.

In some embodiments, a missing-persons site is provided, such that if the Client does not check in after some predetermined amount of time, a photograph, name and/or other information is posted to assist in finding the Client (since the Client did not check back in, the program can automatically invoke a process that would help friends or the public in locating and/or assisting the Client). In some embodiments, the Client can optionally activate or deactivate this function based on the site's privacy policy. In some embodiments, the server elicits and receives information that the Client desires to use and send to the missing-persons site upon a specified triggering event.

In some embodiments, the present invention is set up to be particularly useful for persons using Internet dating services such as e-harmony.com or match.com. For example, if a Client is meeting another person who was referred by the dating service, the Client could use the present invention to notify friends, parents or other relatives, or the police if the Client setup and armed a communication (checked out), and then could not return from the date in a reasonable amount of time to disarm the communication (check in). Such communications would typically be triggered upon the elapse of an amount of time specified by the Client.

In other embodiments, the present invention can be triggered by non-time-based events. For example, if a friend plans to move to a foreign city such as Tokyo, a Client could setup the present invention to start monitoring certain Tokyo-based sensors on checkout, and when the Client's friend moved back from Tokyo, the Client would perform checking in (disarming). The sensors could be triggered by tsunami, earthquake, volcano, meteor impact, or other natural disaster. Further the sensors of some embodiments could be triggered by war, civil unrest, and/or disturbances of the peace. The communication could include text-messaging to the friend, the Client, relatives and/or other interested parties.

In some embodiments, another aspect of the present invention is the ability to arm the system, with a single click or like command, for multiple triggering events, communications, and/or destinations that can be setup in advance, but not yet armed. When the Client then decides to arm the system, the arming command can be performed with a single action, such as with a click on an Internet browser, a text message to a predetermined address, a phone call to a predetermined activation telephone system, or like command. Further, disarming to stop monitoring all sensors or events can also be accomplished as single command. The communications device used for arming the triggered events can be quite different from the device used to enter the triggering information.

In some embodiments, data contained within the database are held privately and confidentially unless requested by police to help in an investigation of the disappearance or possible murder of the Client. In other embodiments, the data are held private unless a release function is checked by the Client indicating their agreement to the release of the information, possibly restricted to certain limitations or circumstances.

In some embodiments, the destination electronic address can be contacted at setup time (or other suitable time), in order that the person having that communications device can opt-out. Thus, destinations who do not want to receive these communications can so indicate, in order that the Client is notified at setup time to designate another destination (e.g., another friend to be notified if the Client does not check back in within the designated time period).

In some embodiments, the present invention provides a computerized method for automatic remote notification that includes eliciting and receiving, into a server, triggering information from a Client, wherein the triggering information includes specifications of a first communication to be sent, a first destination for the first communication, and a first triggering event for sending the first communication, receiving arming information from the Client and arming the sending of the first communication to be sent based on the triggering information, and conditionally sending the first communication from the server to the first destination based on occurrence of the first triggering event.

In some embodiments, the receiving of triggering information occurs within a first information transfer from the Client to the server, and the receiving of arming information also occurs within the first information transfer.

In some embodiments, the specification of destination for the first communication includes an electronic address of a first communications device of a first person, the specification of the first triggering event includes information that defines a first amount of time, the receiving of arming information includes receiving check-out information from the Client and the arming includes starting a timer that triggers upon an elapse of the first amount of time, and the sending of the communication to the destination is based on the elapse of the first amount of time occurring before disarming information is received from the Client.

In some embodiments, the eliciting and receiving of the specification of destination for the first communication further includes eliciting and receiving an approval response from the first person having the first communications device, the eliciting and receiving of the approval response includes receiving contact opt-out information from the first person if they are not interested in participating, and the computerized method further includes notifying the Client that opt-out information for that destination was received.

In some embodiments, the computerized method further includes receiving rearming information from the Client, and extending the first amount of time for the triggering of the timer based on the rearming information.

In some embodiments, the computerized method further includes receiving disarming information from the Client, and disabling the sending of the communication based on the disarming information.

In some embodiments, the computerized method further includes receiving rearming information from the Client, extending the first amount of time for the triggering of the timer based on the rearming information, receiving disarming information from the Client, and disabling the triggering of the timer based on the disarming information, and the specification of the first communication includes an identification of a second person whom the Client is to meet for a date, the specification of the triggering event includes information that defines a second amount of time for the date, the first person will receive the first communication via the first communication device, the receiving of arming information includes receiving check-out information from the Client and the arming includes starting the timer such that it will trigger upon an elapse of the second amount of time, and the sending of the communication to the destination is based on triggering of the timer occurring before disarming information is received from the Client.

In some embodiments, the computerized method further includes receiving disarming information from the Client, and disabling the triggering of the timer based on the disarming information, the triggering information includes specifications of a plurality of communications to be sent including the first communication and a second communication, the specification of the first communication includes an identification of a second person whom the Client is to meet for a date and the specification of the second communication also includes an identification of the second person whom the Client is to meet for the date, a plurality of destinations including the first destination for the first communication and a second destination for the second communication, wherein the first person will receive the first communication via the first communication device, and the specification of destination for the second communication includes an electronic address of a second communications device of a third person, such that the third person will receive the second communication via the second communication device, and a plurality of triggering events including the first triggering event for sending the first communication and a second triggering event for sending the second communication, wherein the first amount of time must elapse before sending the first communication and wherein the specification of the second triggering event includes information that defines a second amount of time that must elapse before sending the second communication, wherein the receiving of arming information from the Client causes arming both the sending of the first communication to be sent to the first destination based on the first triggering event and the sending of the second communication to be sent to the second destination based on the second triggering event, wherein the computerized method further includes conditionally sending the second communication to the second destination based on occurrence of the second triggering event, wherein the sending of the first communication to the first destination is based on elapse of the first amount of time occurring before disarming information is received from the Client, and wherein the sending of the second communication to the second destination is based on elapse of the second amount of time occurring before disarming information is received from the Client.

In some embodiments, the eliciting and receiving of triggering information further includes eliciting and receiving Client payment information, and charging an amount to an account based on the Client payment information.

In some embodiments, the present invention provides an apparatus for automatic remote notification that includes a server, wherein the server is operatively coupled to an Internet, an information database operatively coupled to the server, a trigger module operatively coupled to the information database, wherein the trigger module is configured to elicit and receive triggering information from a Client over the Internet, wherein the trigger module is configured to store the triggering information to the information database, and wherein the triggering information includes specifications of a first communication to be sent, a first destination for the first communication, and a first triggering event for sending the first communication, an arm module operatively coupled to the information database, wherein the arm module is configured to receive arming information related to the triggering information from the Client, wherein the arm module is configured to store the received arming information to the information database, and wherein the arm module is configured to arm the sending of the first communication to be sent based on the triggering information, and a communications device operatively coupled to the information database, wherein the communications device is configured to conditionally send the first communication to the first destination based on occurrence of the first triggering event.

In some embodiments, the trigger module is configured to receive the triggering information within a first information transfer from the Client to the server, and the arm module is also configured to receive the arming information within the first information transfer.

In some embodiments, the specification of destination for the first communication includes an electronic address of a first communications device of a first person, the specification of the first triggering event includes information that defines a first amount of time, the arming information includes check-out information from the Client and the arm module is configured to start a timer that triggers upon an elapse of the first amount of time, and the communications device sends the first communication to the first destination based on the elapse of the first amount of time occurring before disarming information is received from the Client.

In some embodiments, the specification of destination for the first communication further includes an approval response from the first person having the first communications device, the approval response includes contact opt-out information from the first person if they are not interested in participating, and the communications devices is configured to notify the Client that opt-out information for that destination was received.

In some embodiments, the arm module is configured to receive rearming information from the Client, and the arm module is configured to extend the first amount of time to an extended first amount of time based on the rearming information such that the timer is configured to trigger upon an elapse of the extended first amount of time.

In some embodiments, the arm module is configured to receive disarming information from the Client, and the arm module is configured to disable the timer based on the disarming information such that the timer cannot trigger.

In some embodiments, the arm module is configured to receive rearming information from the Client and the arm module is configured to extend the first amount of time for the triggering of the timer based on the rearming information, the arm module is configured to receive disarming information from the Client and the arm module is configured to disable the triggering of the timer based on the disarming information, the specification of the first communication includes an identification of a second person whom the Client is to meet for a date, the specification of the triggering event includes information that defines a second amount of time for the date, the first person will receive the first communication via the first communication device, the arming information includes check-out information from the Client and the arm module is configured to start the timer such that it will trigger upon an elapse of the second amount of time, and the communications device sends the communication to the destination based on triggering of the timer occurring before disarming information is received from the Client.

In some embodiments, the arm module is configured to receive disarming information from the Client and the arm module is configured to disable the triggering of the timer based on the disarming information, and the triggering information includes specifications of a plurality of communications to be sent including the first communication and a second communication, the specification of the first communication includes an identification of a second person whom the Client is to meet for a date and the specification of the second communication also includes an identification of the second person whom the Client is to meet for the date, a plurality of destinations including the first destination for the first communication and a second destination for the second communication, the first person will receive the first communication via the first communication device, and the specification of destination for the second communication includes an electronic address of a second communications device of a third person, such that the third person will receive the second communication via the second communication device, and a plurality of triggering events including the first triggering event for sending the first communication and a second triggering event for sending the second communication, wherein the first amount of time must elapse before sending the first communication and wherein the specification of the second triggering event includes information that defines a second amount of time that must elapse before sending the second communication, wherein the arm module is configured to conditionally arm, upon receipt of arming information from the Client, both the sending of the first communication to be sent to the first destination based on the first triggering event and the sending of the second communication to be sent to the second destination based on the second triggering even, wherein the communications device is configured to send the second communication to the second destination based on occurrence of the second triggering event, wherein the communications device is configured to send the second communication to the second destination based on elapse of the second amount of time occurring before disarming information is received from the Client, and wherein the communications device is configured to send the first communication to the first destination based on elapse of the first amount of time occurring before disarming information is received from the Client.

In some embodiments, the trigger module is configured to receive Client payment information, and the trigger module is configured to charge an amount to an account based on the Client payment information.

In some embodiments, the present invention provides a computer-readable medium having computer-executable instructions stored thereon for causing a suitably-programmed information processor to perform a method that includes eliciting and receiving, into a server, triggering information from a Client, wherein the triggering information includes specifications of a first communication to be sent, a first destination for the first communication, and a first triggering event for sending the first communication, receiving arming information from the Client and arming the sending of the first communication to be sent based on the triggering information, and conditionally sending the first communication from the server to the first destination based on occurrence of the first triggering event.

In some embodiments, the medium further includes instructions such that the receiving of triggering information occurs within a first information transfer from the Client to the server, and such that the receiving of arming information also occurs within the first information transfer.

In some embodiments, the medium further includes instructions such that the specification of destination for the first communication includes an electronic address of a first communications device of a first person, the specification of the first triggering event includes information that defines a first amount of time, the receiving of arming information includes receiving check-out information from the Client and the arming includes starting a timer that triggers upon an elapse of the first amount of time, and the sending of the communication to the destination is based on the elapse of the first amount of time occurring before disarming information is received from the Client.

In some embodiments, the medium further includes instructions such that the eliciting and receiving of the specification of destination for the first communication further includes eliciting and receiving an approval response from the first person having the first communications device, and such that the eliciting and receiving of the approval response includes receiving contact opt-out information from the first person if they are not interested in participating, and the medium further includes instructions to cause the method to include notifying the Client that opt-out information for that destination was received.

In some embodiments, the medium further includes instructions to cause the method to include receiving rearming information from the Client, and extending the first amount of time for the triggering of the timer based on the rearming information.

In some embodiments, the medium further includes instructions to cause the method to include receiving disarming information from the Client, and disabling the sending of the communication based on the disarming information.

In some embodiments, the medium further includes instructions to cause the method to include receiving rearming information from the Client, extending the first amount of time for the triggering of the timer based on the rearming information, receiving disarming information from the Client, and disabling the triggering of the timer based on the disarming information, and the medium further includes instructions such that the specification of the first communication includes an identification of a second person whom the Client is to meet for a date, the specification of the triggering event includes information that defines a second amount of time for the date, the first person will receive the first communication via the first communication device, the receiving of arming information includes receiving check-out information from the Client and the arming includes starting the timer such that it will trigger upon an elapse of the second amount of time, and the sending of the communication to the destination is based on triggering of the timer occurring before disarming information is received from the Client.

In some embodiments, the medium further includes instructions to cause the method to include receiving disarming information from the Client, and disabling the triggering of the timer based on the disarming information, the medium further includes instructions such that the triggering information includes specifications of a plurality of communications to be sent including the first communication and a second communication, wherein the specification of the first communication includes an identification of a second person whom the Client is to meet for a date and the specification of the second communication also includes an identification of the second person whom the Client is to meet for the date, a plurality of destinations including the first destination for the first communication and a second destination for the second communication, wherein the first person will receive the first communication via the first communication device, and the specification of destination for the second communication includes an electronic address of a second communications device of a third person, such that the third person will receive the second communication via the second communication device, and a plurality of triggering events including the first triggering event for sending the first communication and a second triggering event for sending the second communication, wherein the first amount of time must elapse before sending the first communication and wherein the specification of the second triggering event includes information that defines a second amount of time that must elapse before sending the second communication, wherein the medium further includes instructions such that the receiving of arming information from the Client causes arming both the sending of the first communication to be sent to the first destination based on the first triggering event and the sending of the second communication to be sent to the second destination based on the second triggering event, wherein the medium further includes instructions to cause the method to include conditionally sending the second communication to the second destination based on occurrence of the second triggering event, and wherein the medium further includes instructions such that the sending of the first communication to the first destination is based on elapse of the first amount of time occurring before disarming information is received from the Client, and the sending of the second communication to the second destination is based on elapse of the second amount of time occurring before disarming information is received from the Client.

In some embodiments, the medium further includes instructions such that the eliciting and receiving of triggering information further includes eliciting and receiving Client payment information, and charging an amount to an account based on the Client payment information.

In some embodiments, the present invention provides a computerized method for automatic remote notification that includes eliciting and receiving, into a server, triggering information from a Client, wherein the triggering information includes specifications of a first communication to be sent, a first destination for the first communication, and a first triggering event for sending the first communication, receiving arming information from the Client and arming the sending of the first communication to be sent based on the triggering information, and conditionally sending the first communication from the server to the first destination based on occurrence of the first triggering event.

In some embodiments, the receiving of triggering information occurs within a first information transfer from the Client to the server, and the receiving of arming information also occurs within the first information transfer.

In some embodiments, the eliciting and receiving of the specification of the first destination for the first communication includes eliciting and receiving an electronic address of a first communications device of a first person, the eliciting and receiving of the specification of the first triggering event includes eliciting and receiving information that defines a first amount of time, the receiving of arming information includes receiving check-out information from the Client and the arming includes starting a timer that triggers upon an elapse of the first amount of time, and the sending of the first communication to the first destination is based on the elapse of the first amount of time occurring before disarming information is received from the Client.

In some embodiments, the eliciting and receiving of the specification of the first destination for the first communication further includes eliciting and receiving an approval response from the first person having the first communications device, the eliciting and receiving of the approval response includes receiving contact opt-out information from the first person if they are not interested in participating, and the computerized method further includes notifying the Client that opt-out information for the first destination was received.

In some embodiments, the computerized method further includes receiving rearming information from the Client, and extending the first amount of time for the triggering of the timer based on the rearming information.

In some embodiments, the computerized method further includes receiving disarming information from the Client, and disabling the sending of the first communication based on the disarming information.

In some embodiments, the specification of the first destination for the first communication includes an electronic address of a first communications device of a first person such that the first person will receive the first communication via the first communications device, the specification of the first communication includes an identification of a second person whom the Client is to meet for a date, the specification of the first triggering event includes information that defines a first amount of time for the date, the receiving of arming information includes receiving check-out information from the Client and the arming includes enabling sending of the first communication upon an elapse of the first amount of time, the sending of the first communication to the first destination is based on the elapse of the first amount of time occurring before check-in information is received from the Client, and the computerized method further includes receiving rearming information from the Client, extending the first amount of time based on the rearming information, receiving check-in information from the Client, and disabling the sending of the first communication based on the check-in information.

In some embodiments, the triggering information includes specifications of a plurality of communications to be sent including the first communication and a second communication, wherein the specification of the first communication includes an identification of a second person whom the Client is to meet for a date and the specification of the second communication also includes an identification of the second person whom the Client is to meet for the date, a plurality of destinations including the first destination for the first communication and a second destination for the second communication, wherein the specification of the first destination for the first communication includes an electronic address of a first communications device of a first person, such that the first person will receive the first communication via the first communications device, and the specification of the second destination for the second communication includes an electronic address of a second communications device of a third person, such that the third person will receive the second communication via the second communications device, and a plurality of triggering events including the first triggering event for sending the first communication and a second triggering event for sending the second communication, wherein the specification of the first triggering event includes information that defines a first amount of time that must elapse before sending the first communication, and wherein the specification of the second triggering event includes information that defines a second amount of time that must elapse before sending the second communication.

In some embodiments, the receiving of arming information includes receiving check-out information from the Client and enabling both sending of the first communication to the first destination upon an elapse of the first amount of time and sending of the second communication to the second destination upon an elapse of the second amount of time based on the check-out information, and wherein the computerized method further includes receiving disarming information from the Client, disabling both sending of the first communication and sending of the second communication based on the disarming information, wherein the sending of the first communication to the first destination is based on elapse of the first amount of time occurring before disarming information is received from the Client, and wherein the sending of the second communication to the second destination is based on elapse of the second amount of time occurring before disarming information is received from the Client.

In some embodiments, the eliciting and receiving of triggering information further includes eliciting and receiving Client payment information, and charging an amount to an account based on the Client payment information.

In some embodiments, the present invention provides an apparatus for automatic remote notification that includes a server, wherein the server is operatively coupled to an Internet, an information database operatively coupled to the server, a trigger module operatively coupled to the information database, wherein the trigger module is configured to elicit and receive triggering information from a Client over the Internet, wherein the trigger module is configured to store the triggering information to the information database, and wherein the triggering information includes specifications of a first communication to be sent, a first destination for the first communication, and a first triggering event for sending the first communication, an arm module operatively coupled to the information database, wherein the arm module is configured to receive arming information related to the triggering information from the Client, wherein the arm module is configured to store the received arming information to the information database, and wherein the arm module is configured to arm the sending of the first communication to be sent based on the triggering information, and a communications unit operatively coupled to the information database, wherein the communications unit is configured to conditionally send the first communication from the server to the first destination based on occurrence of the first triggering event.

In some embodiments, the trigger module is configured to receive the triggering information within a first information transfer from the Client to the server, and the arm module is also configured to receive the arming information within the first information transfer.

In some embodiments, the specification of the first destination for the first communication includes an electronic address of a first communications device of a first person, the specification of the first triggering event includes information that defines a first amount of time, the arming information includes check-out information from the Client and the arm module is configured to start a timer that triggers upon an elapse of the first amount of time, and the communications unit is configured to send the first communication to the first destination based on the elapse of the first amount of time occurring before disarming information is received from the Client.

In some embodiments, the specification of the first destination for the first communication further includes an approval response from the first person having the first communications device, wherein the approval response includes contact opt-out information from the first person if they are not interested in participating, and wherein the communications unit is configured to notify the Client that opt-out information for the first destination was received.

In some embodiments, the arm module is configured to receive rearming information from the Client, the arm module is configured to extend the first amount of time to an extended first amount of time based on the rearming information such that the timer is configured to trigger upon an elapse of the extended first amount of time.

In some embodiments, the arm module is configured to receive disarming information from the Client, and the arm module is configured to disable the timer based on the disarming information such that the communications unit cannot send the first communication.

In some embodiments, the specification of the first destination for the first communication includes an electronic address of a first communications device of a first person, such that the first person will receive the first communication via the first communications device, the specification of the first communication includes an identification of a second person whom the Client is to meet for a date, the specification of the first triggering event includes information that defines a first amount of time for the date, the arming information includes check-out information from the Client and the arm module is configured to enable sending of the first communication upon an elapse of the first amount of time, the communications unit is configured to send the first communication to the first destination based on the elapse of the first amount of time occurring before check-in information is received from the Client, the arm module is configured to receive rearming information from the Client and the arm module is configured to extend the first amount of time based on the rearming information, and the arm module is configured to receive check-in information from the Client and the arm module is configured to disable the sending of the first communication based on the check-in information.

In some embodiments, the triggering information includes specifications of a plurality of communications to be sent including the first communication and a second communication, wherein the specification of the first communication includes an identification of a second person whom the Client is to meet for a date and the specification of the second communication also includes an identification of the second person whom the Client is to meet for the date, a plurality of destinations including the first destination for the first communication and a second destination for the second communication, wherein the specification of the first destination for the first communication includes an electronic address of a first communications device of a first person, such that the first person will receive the first communication via the first communications device, and the specification of the second destination for the second communication includes an electronic address of a second communications device of a third person, such that the third person will receive the second communication via the second communications device, and a plurality of triggering events including the first triggering event for sending the first communication and a second triggering event for sending the second communication, wherein the specification of the first triggering event includes information that defines a first amount of time that must elapse before sending the first communication, and wherein the specification of the second triggering event includes information that defines a second amount of time that must elapse before sending the second communication.

In some embodiments, the arm module is configured to enable, upon receipt of check-out information from the Client, both sending of the first communication to the first destination upon an elapse of the first amount of time and sending of the second communication to the second destination upon an elapse of the second amount of time based on the check-out information, the arm module is configured to disable, upon receipt of disarming information from the Client, both sending of the first communication and sending of the second communication based on the disarming information, wherein the communications unit is configured to send the first communication to the first destination based on elapse of the first amount of time occurring before disarming information is received from the Client, and the communications unit is configured to send the second communication to the second destination based on elapse of the second amount of time occurring before disarming information is received from the Client.

In some embodiments, the triggering information includes Client payment information, and the trigger module is configured to charge an amount to an account based on the Client payment information.

In some embodiments, the present invention provides a computer-readable medium having computer-executable instructions stored thereon for causing a suitably-programmed information processor to perform a method that includes eliciting and receiving, into a server, triggering information from a Client, wherein the triggering information includes specifications of a first communication to be sent, a first destination for the first communication, and a first triggering event for sending the first communication, receiving arming information from the Client and arming the sending of the first communication to be sent based on the triggering information, and conditionally sending the first communication from the server to the first destination based on occurrence of the first triggering event.

In some embodiments, the medium further includes instructions such that the receiving of triggering information occurs within a first information transfer from the Client to the server, and the receiving of arming information also occurs within the first information transfer.

In some embodiments, the medium further includes instructions such that the eliciting and receiving of the specification of the first destination for the first communication includes eliciting and receiving an electronic address of a first communications device of a first person, the eliciting and receiving of the specification of the first triggering event includes eliciting and receiving information that defines a first amount of time, the receiving of arming information includes receiving check-out information from the Client and the arming includes starting a timer that triggers upon an elapse of the first amount of time, and the sending of the first communication to the first destination is based on the elapse of the first amount of time occurring before disarming information is received from the Client.

In some embodiments, the medium further includes instructions such that the eliciting and receiving of the specification of the first destination for the first communication further includes eliciting and receiving an approval response from the first person having the first communications device, and the eliciting and receiving of the approval response includes receiving contact opt-out information from the first person if they are not interested in participating, and wherein the medium further includes instructions to cause the method to include notifying the Client that opt-out information for the first destination was received.

In some embodiments, the medium further includes instructions to cause the method to include receiving rearming information from the Client, extending the first amount of time for the triggering of the timer based on the rearming information, receiving disarming information from the Client, and disabling the sending of the first communication based on the disarming information.

In some embodiments, the medium further includes instructions such that the specification of the first destination for the first communication includes an electronic address of a first communications device of a first person such that the first person will receive the first communication via the first communications device, the specification of the first communication includes an identification of a second person whom the Client is to meet for a date, the specification of the first triggering event includes information that defines a first amount of time for the date, the receiving of arming information includes receiving check-out information from the Client and the arming includes enabling sending of the first communication upon an elapse of the first amount of time, and the sending of the first communication to the first destination is based on the elapse of the first amount of time occurring before check-in information is received from the Client, and wherein the medium further includes instructions to cause the method to include receiving rearming information from the Client, extending the first amount of time based on the rearming information, receiving check-in information from the Client, and disabling the sending of the first communication based on the check-in information.

In some embodiments, the medium further includes instructions such that the triggering information includes specifications of a plurality of communications to be sent including the first communication and a second communication, wherein the specification of the first communication includes an identification of a second person whom the Client is to meet for a date and the specification of the second communication also includes an identification of the second person whom the Client is to meet for the date, a plurality of destinations including the first destination for the first communication and a second destination for the second communication, wherein the specification of the first destination for the first communication includes an electronic address of a first communications device of a first person, such that the first person will receive the first communication via the first communications device, and the specification of the second destination for the second communication includes an electronic address of a second communications device of a third person, such that the third person will receive the second communication via the second communications device, and a plurality of triggering events including the first triggering event for sending the first communication and a second triggering event for sending the second communication, wherein the specification of the first triggering event includes information that defines a first amount of time that must elapse before sending the first communication, and wherein the specification of the second triggering event includes information that defines a second amount of time that must elapse before sending the second communication.

In some embodiments, the receiving of arming information includes receiving check-out information from the Client and enabling both sending of the first communication to the first destination upon an elapse of the first amount of time and sending of the second communication to the second destination upon an elapse of the second amount of time based on the check-out information, and wherein the medium further includes instructions to cause the method to include receiving disarming information from the Client, and disabling both sending of the first communication and sending of the second communication based on the disarming information, wherein the sending of the first communication to the first destination is based on elapse of the first amount of time occurring before disarming information is received from the Client, and wherein the sending of the second communication to the second destination is based on elapse of the second amount of time occurring before disarming information is received from the Client.

In some embodiments, the present invention provides a computerized method for automatic remote notification that includes eliciting and receiving, into a server, triggering information from a Client, wherein the triggering information includes specifications of a first communication to be sent, a first destination for the first communication, and a first triggering event for sending the first communication; receiving arming information from the Client and arming the sending of the first communication to be sent based on the triggering information; and conditionally sending the first communication from the server to the first destination based on occurrence of the first triggering event.

In some embodiments of this method, the receiving of triggering information occurs within a first information transfer from the Client to the server, and the receiving of arming information also occurs within the first information transfer.

In some embodiments of this method, the eliciting and receiving of the specification of the first destination for the first communication includes eliciting and receiving an electronic address of a first communications device of a first person; the eliciting and receiving of the specification of the first triggering event includes eliciting and receiving information that defines a first amount of time; the receiving of arming information includes receiving check-out information from the Client and the arming includes starting a timer that triggers upon an elapse of the first amount of time; and the sending of the first communication to the first destination is based on the elapse of the first amount of time occurring before disarming information is received from the Client. In some embodiments of the method, the eliciting and receiving of the specification of the first destination for the first communication further includes eliciting and receiving an approval response from the first person having the first communications device, the eliciting and receiving of the approval response includes receiving contact opt-out information from the first person if they are not interested in participating, and the method further includes notifying the Client that opt-out information for the first destination was received. Some embodiments further include receiving rearming information from the Client; and extending the first amount of time for the triggering of the timer based on the rearming information. Some embodiments further include receiving disarming information from the Client; and disabling the sending of the first communication based on the disarming information.

In some embodiments of this method, the specification of the first destination for the first communication includes an electronic address of a first communications device of a first person such that the first person will receive the first communication via the first communications device; the specification of the first communication includes an identification of a second person whom the Client is to meet for a date; the specification of the first triggering event includes information that defines a first amount of time for the date; the receiving of arming information includes receiving check-out information from the Client and the arming includes enabling sending of the first communication upon an elapse of the first amount of time; and the sending of the first communication to the first destination is based on the elapse of the first amount of time occurring before check-in information is received from the Client, and the method further includes receiving rearming information from the Client; extending the first amount of time based on the rearming information; receiving check-in information from the Client; and disabling the sending of the first communication based on the check-in information.

In some embodiments of this method,
the triggering information includes specifications of:
a plurality of communications to be sent including the first communication and a second communication, in which the specification of the first communication includes an identification of a second person whom the Client is to meet for a date and the specification of the second communication also includes an identification of the second person whom the Client is to meet for the date;
a plurality of destinations including the first destination for the first communication and a second destination for the second communication, in which the specification of the first destination for the first communication includes an electronic address of a first communications device of a first person, such that the first person will receive the first communication via the first communications device, and the specification of the second destination for the second communication includes an electronic address of a second communications device of a third person, such that the third person will receive the second communication via the second communications device; and a plurality of triggering events including the first triggering event for sending the first communication and a second triggering event for sending the second communication, in which the specification of the first triggering event includes information that defines a first amount of time that must elapse before sending the first communication, and the specification of the second triggering event includes information that defines a second amount of time that must elapse before sending the second communication;

the receiving of arming information includes receiving check-out information from the Client and enabling both sending of the first communication to the first destination upon an elapse of the first amount of time and sending of the second communication to the second destination upon an elapse of the second amount of time based on the check-out information;

the method further includes receiving disarming information from the client, and disabling both sending of the first communication and sending of the second communication based on the disarming information, the sending of the first communication to the first destination is based on elapse of the first amount of time occurring before disarming information is received from the Client; and the sending of the second communication to the second destination is based on elapse of the second amount of time occurring before disarming information is received from the Client.

In some embodiments, the eliciting and receiving of triggering information further includes eliciting and receiving Client payment information, and charging an amount to an account based on the Client payment information.

In some embodiments, the present invention provides an apparatus for automatic remote notification. This apparatus includes a server, and the server is operatively coupled to an Internet; an information database operatively coupled to the server; a trigger module operatively coupled to the information database, wherein the trigger module is configured to elicit and receive triggering information from a Client over the Internet, the trigger module is configured to store the triggering information to the information database, and the triggering information includes specifications of a first communication to be sent, a first destination for the first communication, and a first triggering event for sending the first communication; an arm module operatively coupled to the information database, wherein the arm module is configured to receive arming information related to the triggering information from the Client, the arm module is configured to store the received arming information to the information database, and the arm module is configured to arm the sending of the first communication to be sent based on the triggering information; and a communications unit operatively coupled to the information database, wherein the communications unit is configured to conditionally send the first communication from the server to the first destination based on occurrence of the first triggering event.

In some embodiments of this apparatus, the trigger module is configured to receive the triggering information within a first information transfer from the Client to the server, and the arm module is also configured to receive the arming information within the first information transfer.

In some embodiments of this apparatus, the specification of the first destination for the first communication includes an electronic address of a first communications device of a first person; the specification of the first triggering event includes information that defines a first amount of time; the arming information includes check-out information from the Client and the arm module is configured to start a timer that triggers upon an elapse of the first amount of time; and the communications unit is configured to send the first communication to the first destination based on the elapse of the first amount of time occurring before disarming information is received from the Client.

In some embodiments of this apparatus, the specification of the first destination for the first communication further includes an approval response from the first person having the first communications device, wherein the approval response includes contact opt-out information from the first person if they are not interested in participating, and the communications unit is configured to notify the Client that opt-out information for the first destination was received.

In some embodiments of this apparatus, the arm module is configured to receive rearming information from the Client, and the arm module is configured to extend the first amount of time to an extended first amount of time based on the rearming information such that the timer is configured to trigger upon an elapse of the extended first amount of time.

In some embodiments of this apparatus, the arm module is configured to receive disarming information from the Client, and the arm module is configured to disable the timer based on the disarming information such that the communications unit cannot send the first communication.

In some embodiments of this apparatus, the specification of the first destination for the first communication includes an electronic address of a first communications device of a first person, such that the first person will receive the first communication via the first communications device; the specification of the first communication includes an identification of a second person whom the Client is to meet for a date; the specification of the first triggering event includes information that defines a first amount of time for the date; the arming information includes check-out information from the Client and the arm module is configured to enable sending of the first communication upon an elapse of the first amount of time; the communications unit is configured to send the first communication to the first destination based on the elapse of the first amount of time occurring before check-in information is received from the Client; the arm module is configured to receive rearming information from the Client and the arm module is configured to extend the first amount of time based on the rearming information; and the arm module is configured to receive check-in information from the Client and the arm module is configured to disable the sending of the first communication based on the check-in information.

In some embodiments of this apparatus,
the triggering information includes specifications of:
a plurality of communications to be sent including the first communication and a second communication, wherein the specification of the first communication includes an identification of a second person whom the Client is to meet for a date and the specification of the second communication also includes an identification of the second person whom the Client is to meet for the date;
a plurality of destinations including the first destination for the first communication and a second destination for the second communication, wherein the specification of the first destination for the first communication includes an electronic address of a first communications device of a first person, such that the first person will receive the first communication via the first communications device, and the specification of the second destination for the second communication includes an electronic address of a second communications device of a third person, such that the third person will receive the second communication via the second communications device; and a plurality of triggering events including the first triggering event for sending the first communication and a second triggering event for sending the second communication, wherein the specification of the first triggering event includes information that defines a first amount of time that must elapse before sending the first communication, and wherein the specification of the second triggering event includes information that defines a second amount of time that must elapse before sending the second communication;

the arm module is configured to enable, upon receipt of check-out information from the Client, both sending of the first communication to the first destination upon an elapse of the first amount of time and sending of the second communication to the second destination upon an elapse of the second amount of time based on the check-out information;

the arm module is configured to disable, upon receipt of disarming information from the Client, both sending of the first communication and sending of the second communication based on the disarming information, the communications unit is configured to send the first communication to the first destination based on elapse of the first amount of time occurring before disarming information is received from the Client; and the communications unit is configured to send the second communication to the second destination based on elapse of the second amount of time occurring before disarming information is received from the Client.

In some embodiments of this apparatus, the triggering information includes Client payment information, and the trigger module is configured to charge an amount to an account based on the Client payment information.

In some embodiments, the present invention provides a computer-readable medium having computer-executable instructions stored thereon for causing a suitably-programmed information processor to perform a method that includes eliciting and receiving, into a server, triggering information from a Client, wherein the triggering information includes specifications of a first communication to be sent, a first destination for the first communication, and a first triggering event for sending the first communication; receiving arming information from the Client and arming the sending of the first communication to be sent based on the triggering information; and conditionally sending the first communication from the server to the first destination based on occurrence of the first triggering event.

In some such embodiments, the medium further includes instructions such that the receiving of triggering information occurs within a first information transfer from the Client to the server, and the receiving of arming information also occurs within the first information transfer.

In some embodiments, the medium further includes instructions such that: the eliciting and receiving of the specification of the first destination for the first communication includes eliciting and receiving an electronic address of a first communications device of a first person; the eliciting and receiving of the specification of the first triggering event includes eliciting and receiving information that defines a first amount of time; the receiving of arming information includes receiving check-out information from the Client and the arming includes starting a timer that triggers upon an elapse of the first amount of time; and the sending of the first communication to the first destination is based on the elapse of the first amount of time occurring before disarming information is received from the Client. In some such embodiments, the medium further includes instructions such that the eliciting and receiving of the specification of the first destination for the first communication further includes eliciting and receiving an approval response from the first person having the first communications device, wherein the eliciting and receiving of the approval response includes receiving contact opt-out information from the first person if they are not interested in participating, and the medium further includes instructions to cause the method to include notifying the Client that opt-out information for the first destination was received. In some embodiments, the medium further includes instructions to cause the method to include: receiving rearming information from the Client; extending the first amount of time for the triggering of the timer based on the rearming information; receiving disarming information from the Client; and disabling the sending of the first communication based on the disarming information.

In some embodiments, the medium further includes instructions such that: the specification of the first destination for the first communication includes an electronic address of a first communications device of a first person such that the first person will receive the first communication via the first communications device; the specification of the first communication includes an identification of a second person whom the Client is to meet for a date; the specification of the first triggering event includes information that defines a first amount of time for the date; the receiving of arming information includes receiving check-out information from the Client and the arming includes enabling sending of the first communication upon an elapse of the first amount of time; and the sending of the first communication to the first destination is based on the elapse of the first amount of time occurring before check-in information is received from the Client, and the medium further includes instructions to cause the method to include: receiving rearming information from the Client; extending the first amount of time based on the rearming information; receiving check-in information from the Client; and disabling the sending of the first communication based on the check-in information.

In some embodiments, the medium further includes instructions such that:

the triggering information includes specifications of:

a plurality of communications to be sent including the first communication and a second communication, wherein the specification of the first communication includes an identification of a second person whom the Client is to meet for a date and the specification of the second communication also includes an identification of the second person whom the Client is to meet for the date;

a plurality of destinations including the first destination for the first communication and a second destination for the second communication, wherein the specification of the first destination for the first communication includes an electronic address of a first communications device of a first person, such that the first person will receive the first communication via the first communications device, and the specification of the second destination for the second communication includes an electronic address of a second communications device of a third person, such that the third person will receive the second communication via the second communications device; and a plurality of triggering events including the first triggering event for sending the first communication and a second triggering event for sending the second communication, wherein the specification of the first triggering event includes information that defines a first amount of time that must elapse before sending the first communication, and wherein the specification of the second triggering event includes information that defines a second amount of time that must elapse before sending the second communication;

the receiving of arming information includes receiving check-out information from the Client and enabling both sending of the first communication to the first destination upon an elapse of the first amount of time and sending of the second communication to the second destination upon an elapse of the second amount of time based on the check-out information, and the medium further includes instructions to cause the method to include receiving disarming information from the Client, and disabling both sending of the first communication and sending of the second communication based on the disarming information, the sending of the first communication to the first destination is based on elapse of the first amount of time occurring before disarming information is received from the Client; and the sending of the second communication to the second destination is based on elapse of the second amount of time occurring before disarming information is received from the Client.

The following exemplary Selected Database Table Layouts provide one of skill in the art sufficient information to implement some embodiments of the invention:

| Account Table | |
|---|---|
| account_ID | bigint |
| account_userName | nchar (20) |
| account_password | nchar (25) |
| account_name_first | nchar (20) |
| account_name_last | nchar (20) |
| account_address_city | nchar (25) |
| account_address_state | nchar (5) |
| account_address_zip | nchar (10) |
| account_email | nchar (50) |
| account_time_zone | int |
| account_dob | datetime |
| account_cell | nchar (10) |
| account_sexual_orientation | int |
| account_relationship_status | int |
| account_verify_code | nchar (6) |
| account_verified | bit |
| account_date_created | datetime |
| account_date_modified | datetime |
| account_date_lastLogin | datetime |

| Friends Table | |
|---|---|
| friends_ID | |
| friends_account_ID | bigint |
| friends_deleted | bit |
| friends_name_last | nchar (20) |
| friends_name_first | nchar (20) |
| friends_email | nchar (50) |
| friends_phone | nchar (10) |
| friends_date_created | datetime |
| friends_date_modified | datetime |
| friends_date_deleted | datetime |

| HookUp Table | |
|---|---|
| hookUp_ID | bigint |
| hookUp_account_ID | bigint |
| hookUp_deleted | bit |
| hookUp_name_nick | varchar (25) |
| hookUp_name_first | nchar (20) |
| hookUp_name_last | nchar (20) |
| hookUp_address | nvarchar (75) |
| hookUp_address_apartment | nvarchar (15) |
| hookUp_address_city | nvarchar (25) |
| hookUp_address_state | nvarchar (5) |
| hookUp_address_zip | nvarchar (10) |
| hookUp_phone | nvarchar (10) |
| hookUp_email | nvarchar (50) |
| hookUp_screen_name | nvarchar (30) |
| hookUp_stats | nvarchar (50) |
| hookUp_chat_log | nvarchar (MAX) |
| hookUp_how_did_they_meet | nvarchar (100) |
| hookUp_notes | nvarchar (MAX) |
| hookUp_date_created | datetime |
| hookUp_date_modified | datetime |
| hookUp_date_deleted | datetime |

| Meeting Table | |
|---|---|
| meeting_ID | bigint |
| meeting_account_ID | bigint |
| meeting_hookUp_ID | bigint |
| meeting_notify_friends_of_hookup | bit |
| meeting_date_created | datetime |
| meeting_date_notify_friends | datetime |
| meeting_friends_notified | bit |
| meeting_cancelled | bit |
| meeting_date_cancelled | datetime |

The following form a Table of Selected Database Stored Procedures (Representative SQL-Server procedures for some embodiments)

| New Account |
|---|

```
STORED PROCEDURE [dbo].[account_new]
    @account_userName           nchar(20)   ,
    @account_password           nchar(25)   ,
    @account_name_first         nchar(20)   ,
    @account_name_last          nchar(20)   ,
    @account_address_city       nchar(25)   ,
    @account_address_state      nchar(5)    ,
    @account_address_zip        nchar(10)   ,
    @account_email              nchar(50)   ,
    @account_time_zone          int         ,
    @account_dob                datetime    ,
    @account_cell               nchar(10)   ,
    @account_sexual_orientation int         ,
    @account_relationship_status int        ,
    @account_verify_code        nchar(6)    ,
    @ReturnValue int OUTPUT
AS
BEGIN
    INSERT INTO [account]
    (
        account_userName            ,
        account_password            ,
        account_name_first          ,
        account_name_last           ,
        account_address_city        ,
        account_address_state       ,
        account_address_zip         ,
        account_email               ,
```

-continued

New Account

```
        account_time_zone              ,
        account_dob                    ,
        account_cell                   ,
        account_sexual_orientation     ,
        account_relationship_status    ,
        account_verify_code            ,
        account_verified               ,
        account_date_created           ,
        account_date_lastLogin         ,
    )
    VALUES
    (
        @account_userName              ,
        @account_password              ,
        @account_name_first            ,
        @account_name_last             ,
        @account_address_city          ,
        @account_address_state         ,
        @account_address_zip           ,
        @account_email                 ,
        @account_time_zone             ,
        @account_dob                   ,
        @account_cell                  ,
        @account_sexual_orientation    ,
        @account_relationship_status   ,
        @account_verify_code           ,
        0                              ,
        GETDATE( )                     ,
        GETDATE( )                     ,
    )
    ;
    IF @@ROWCOUNT = 1
        BEGIN
            SET @ReturnValue = 1;
            RETURN @ReturnValue;
        END
    SET @ReturnValue = 0;
    RETURN @ReturnValue;
END
```

Delete Friend

```
STORED PROCEDURE [dbo].[friend_delete]
        @friendID       bigint    ,
        @account_ID     bigint
AS
BEGIN
    UPDATE
        friends
    SET
        friends_deleted      =    1              ,
        friends_date_deleted =    GETDATE( )
    WHERE
        friends_ID         = @friendID
        AND
        friends_account_ID = @account_ID
    ;
END
```

New Friend

```
STORED PROCEDURE [dbo].[friend_new]
        @friends_account_ID    bigint,
        @friends_name_last     nchar(20)    ,
        @friends_name_first    nchar(20)    ,
        @friends_email         nchar(50)    ,
        @friends_phone         nchar(10)    ,
        @ReturnValue           int          OUTPUT
```

-continued

New Friend

```
AS
BEGIN
    INSERT INTO
        friends
        (
            friends_account_ID    ,
            friends_deleted       ,
            friends_name_last     ,
            friends_name_first    ,
            friends_email         ,
            friends_phone         ,
            friends_date_created  ,
        )
        VALUES
        (
            @friends_account_ID   ,
            0                     ,
            @friends_name_last    ,
            @friends_name_first   ,
            @friends_email        ,
            @friends_phone        ,
            GETDATE( )
        )
        ;
    IF @@ROWCOUNT = 1
        BEGIN
            SET @ReturnValue = 1;
            RETURN @ReturnValue;
        END
    SET @ReturnValue = 0;
    RETURN @ReturnValue;
END
```

New HookUp

```
STORED PROCEDURE [dbo].[hookUp_new]
        @hookUp_account_ID          bigint           ,
        @hookUp_name_nick           varchar(25)      ,
        @hookUp_name_first          nchar(20)        ,
        @hookUp_name_last           nchar(20)        ,
        @hookUp_address             nvarchar(75)     ,
        @hookUp_address_apartment   nvarchar(15)     ,
        @hookUp_address_city        nvarchar(25)     ,
        @hookUp_address_state       nvarchar(5)      ,
        @hookUp_address_zip         nvarchar(10)     ,
        @hookUp_phone               nvarchar(10)     ,
        @hookUp_email               nvarchar(50)     ,
        @hookUp_screen_name         nvarchar(30)     ,
        @hookUp_stats               nvarchar(50)     ,
        @hookUp_chat_log            nvarchar(MAX)    ,
        @hookUp_how_did_they_meet   nvarchar(100)    ,
        @hookUp_notes               nvarchar(MAX)    ,
        @ReturnValue                int              OUTPUT
AS
BEGIN
    INSERT INTO
        hookup
        (
            hookUp_account_ID          ,
            hookUp_deleted             ,
            hookUp_name_nick           ,
            hookUp_name_first          ,
            hookUp_name_last           ,
            hookUp_address             ,
            hookUp_address_apartment   ,
            hookUp_address_city        ,
            hookUp_address_state       ,
            hookUp_address_zip         ,
            hookUp_phone               ,
            hookUp_email               ,
            hookUp_screen_name         ,
            hookUp_stats               ,
```

-continued

New HookUp

```
        hookUp_chat_log            ,
        hookUp_how_did_they_meet   ,
        hookUp_notes               ,
        hookUp_date_created        ,
    )
    VALUES
    (
        @hookUp_account_ID         ,
        0                          ,
        @hookUp_name_nick          ,
        @hookUp_name_first         ,
        @hookUp_name_last          ,
        @hookUp_address            ,
        @hookUp_address_apartment  ,
        @hookUp_address_city       ,
        @hookUp_address_state      ,
        @hookUp_address_zip        ,
        @hookUp_phone              ,
        @hookUp_email              ,
        @hookUp_screen_name        ,
        @hookUp_stats              ,
        @hookUp_chat_log           ,
        @hookUp_how_did_they_meet  ,
        @hookUp_notes              ,
        GETDATE( )
    )
    ;
    IF @@ROWCOUNT =1
        BEGIN
            SET @ReturnValue =1;
            RETURN @ReturnValue;
        END
    SET @ReturnValue = 0;
    RETURN @ReturnValue;
END
```

Delete HookUp

```
STORED PROCEDURE [dbo].[hookUp_delete]
        @hookUpID    bigint        ,
        @account_ID  bigint
AS
BEGIN
    UPDATE
        hookup
    SET
        hookUp_deleted =         1           ,
        hookUp_date_deleted =    GETDATE( )
    WHERE
        hookUp_ID =              @hookUpID
        AND
        hookUp_account_ID =      @account_ID
    ;
END
```

As used herein, certain terms (e.g., Client, Internet, SIGN IN PAGE, MANAGE FRIENDS PAGE and the like) have either the first letter or entire phrase capitalized for ease of reading. Such capitalization is not an indication of limitations as to the breadth of the term, and should be interpreted as broadly as if these words were not capitalized. Further, these capitalized terms should be considered to be equivalent to and interchangeable with their non-capitalized counterparts.

As used herein, "Client" means a person who is, e.g., using a web browser interface or a Blackberry®-type device or other suitable communications device to enter information; and a "client computer" means the information processor and/or communications device used by a Client.

As used herein, "server" means the information processor and/or communications device used by the invention to receive triggering information and arming-rearming-disarming information, and sending communications. In some embodiments, a server includes interface devices that facilitate the sending of communications, such as an Internet interface, wireless interface, POTS interface, text-messaging interface, and the like.

As used herein, "information database" is the inclusive set of data that are used by the present invention to control operation of the invention, i.e., the triggering information, arming information and the like that control if and when a communication is to be sent.

FIG. 4 is a screen shot of a SIGN IN PAGE 400 of some embodiments that requests authentication credentials in the form of user name and password from a Client. Once provided, the website system determines whether authentication credentials are valid and either displays a message of invalidity or redirects the Client's browser to the HOME PAGE described in FIG. 5. In addition, a mechanism is represented that allows a new Client to initiate the process to join. Further, a mechanism is represented that allows a Client to initiate a process to recover forgotten authentication credentials.

Figure 5:
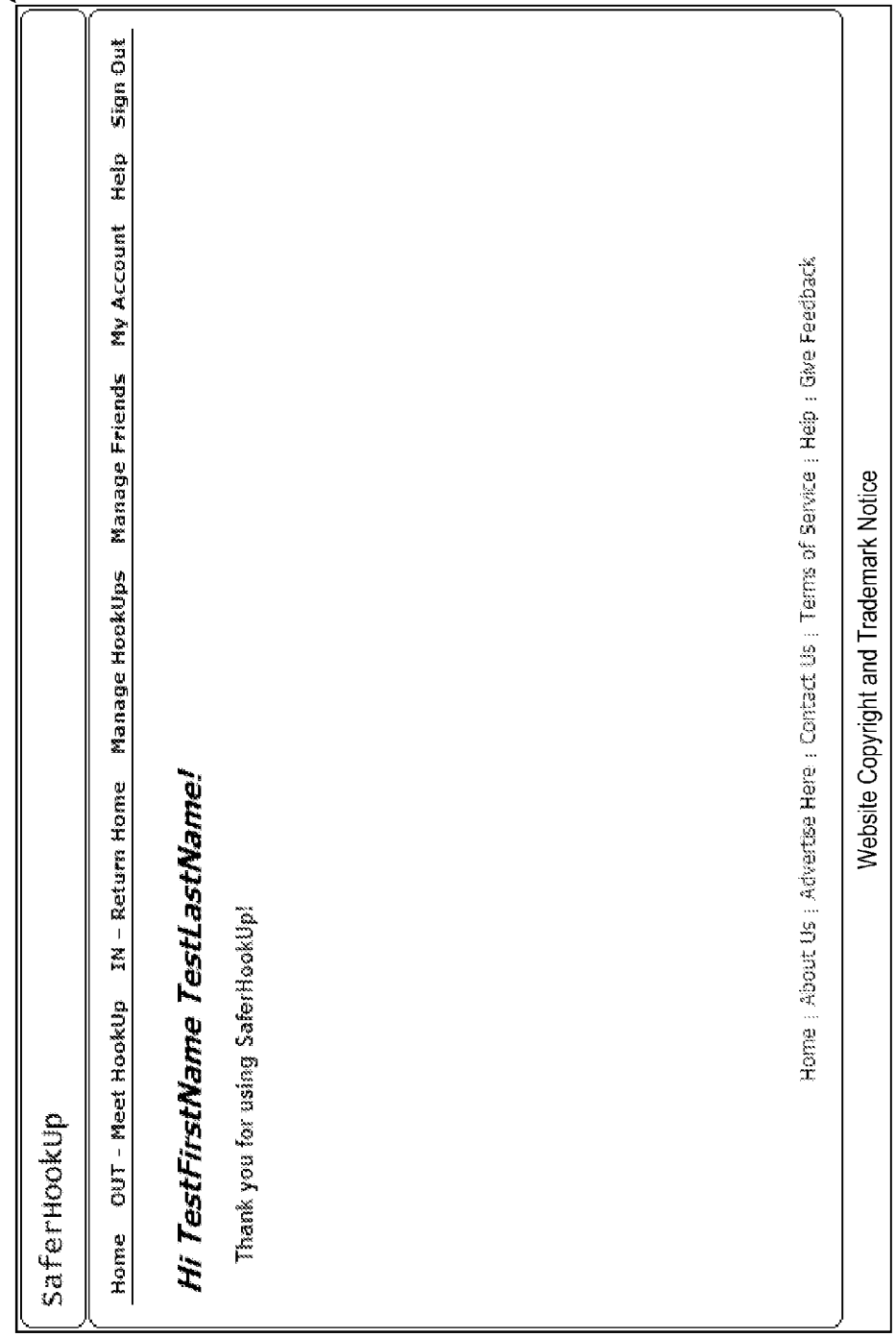
FIG. 5 is a screen shot of a HOME PAGE 500 of some embodiments.

FIG. 5 is a screen shot of a HOME PAGE 500 of some embodiments. This website page provides Clients a central mechanism to initiate all of the websites functionality. This is achieved using a system of menus at the top and bottom of the page utilizing hypertext links. A mechanism to deliver Clients with updated news and other notices is illustrated in the figure.

Figure 6:
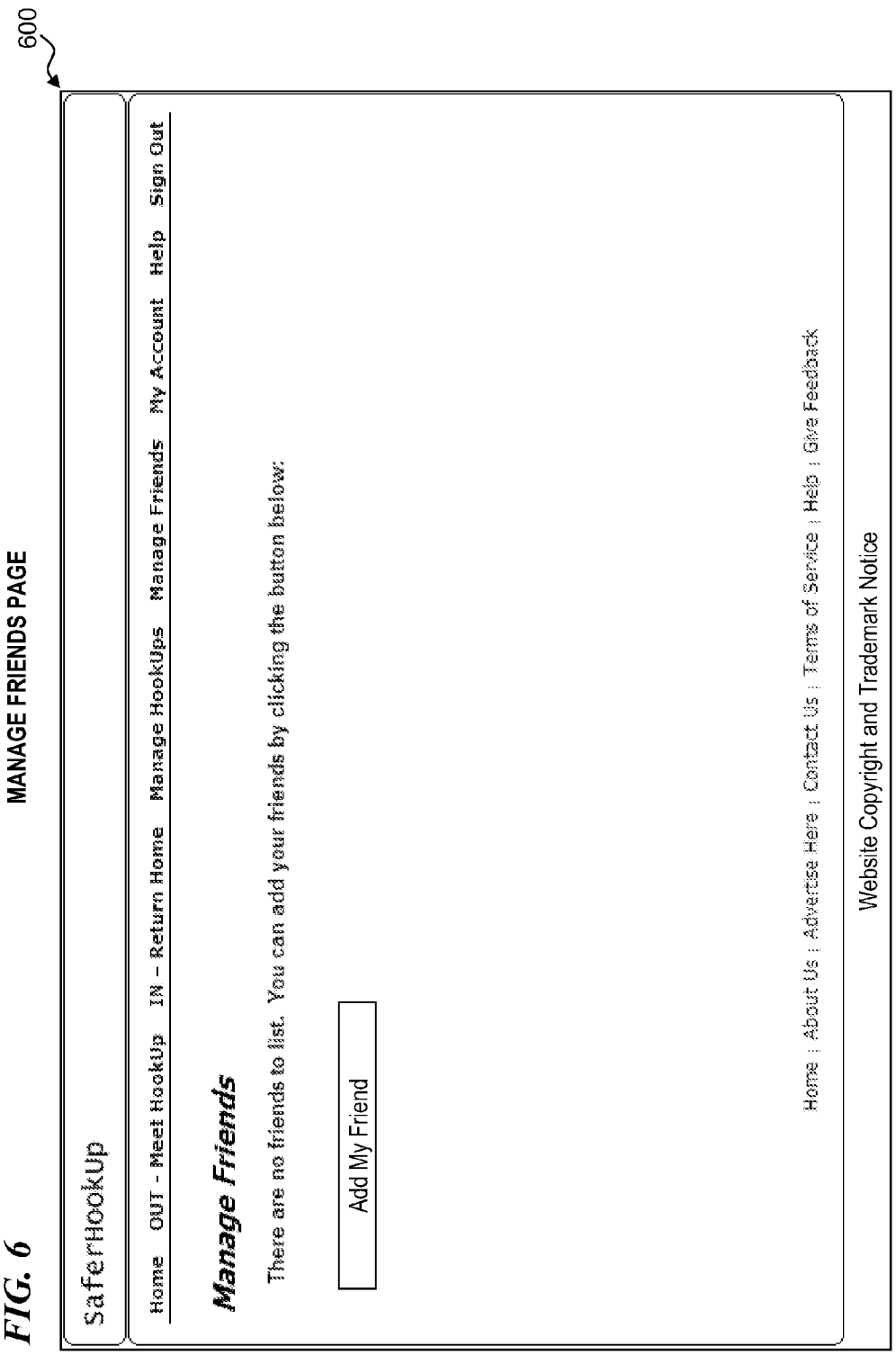
FIG. 6 is a screen shot of a MANAGE FRIENDS PAGE 600 of some embodiments.

FIG. 6 is a screen shot of a MANAGE FRIENDS PAGE 600 of some embodiments that illustrates mechanism for Clients to manage Friends. The specific instance where no Friends have been defined by the Client is demonstrated. In addition, a mechanism is shown that allows Clients to initiate the process to add a Friend.

FIG. 7 is a screen shot of an ADD NEW FRIEND PAGE 700 of some embodiments and demonstrates the elicitation of Friend information from the Client for storage in the database. Once the Client activates the Submit button, the website system validates information provided and either displays an error message or adds a new Friend to the database.

FIG. 8 is a screen shot of a MANAGE FRIENDS—FRIEND ADDED screen 800 of some embodiments illustrating the successful addition of a new friend, as shown in the previous figure. Mechanisms to edit and delete existing Friends are demonstrated. All Client's Friends are enumerated in the table as part of the mechanism to edit and delete existing Friends.

FIG. 9 is a screen shot of an OUT—MEET HOOKUP PAGE—NEW HOOKUP screen 900 of some embodiments showing the first step of the Trigger process that elicits information from the Client regarding the type of Hookup. A mechanism is illustrated that allows the Client to quickly indicate the future Hookup is with a previous Partner, thus saving time from having to reenter information. Another mechanism is demonstrated to cancel the Hookup Trigger at this step in the arming process.

FIG. 10 is a screen shot of an OUT—MEET HOOKUP PAGE—NEW HOOKUP DETAILS PAGE 1000 of some embodiments detailing various elements of information solicited from the Client regarding a new Hookup and represent the next step in the arming process. Once the Client clicks the Submit button data are validated and in the event of input errors an error message is displayed to the Client. Once data are successfully validated, the final step in the Hookup arming process is presented to the Client.

FIG. 11 is a screen shot of an OUT—MEET HOOKUP PAGE—NEW HOOKUP DURATION screen 1100 of some embodiments, and illustrates the final step in the Hookup arming process and demonstrates the mechanism used specify the amount of time the Trigger will be armed for using a drop down control populated with various time intervals. Once the Finish button is clicked the website system will cause the alarm to be set, by causing information to be populated and updated within the database, and redirect the Client the final confirmation page in the arming process described in the next figure.

FIG. 12 is a screen shot of an OUT—MEET HOOKUP PAGE—NEW HOOKUP REGISTRATION CONFIRMATION screen 1200 of some embodiments. This website page illustrates the final confirmation page in the Hookup arming process by presenting the Client with a summary of the Hookup details. A mechanism is illustrated that allows the Client to click a button to sign out of the website. Once the Sign Out button is clicked the website system redirects the client to the SIGN IN page shown above in FIG. 4.

FIG. 13 is a screen shot of an IN—RETURN HOME PAGE 1300 of some embodiments that illustrates a representative website page a Client will be presented with while a Hookup is armed and after signing on to the website following the mechanism as shown in FIG. 4 above. A mechanism is illustrated that allows the Client to Check In any armed triggers. Once the Client clicks the Check In button, the website system deactivates the trigger, by causing information to be populated and updated within the database.

Figure 14:
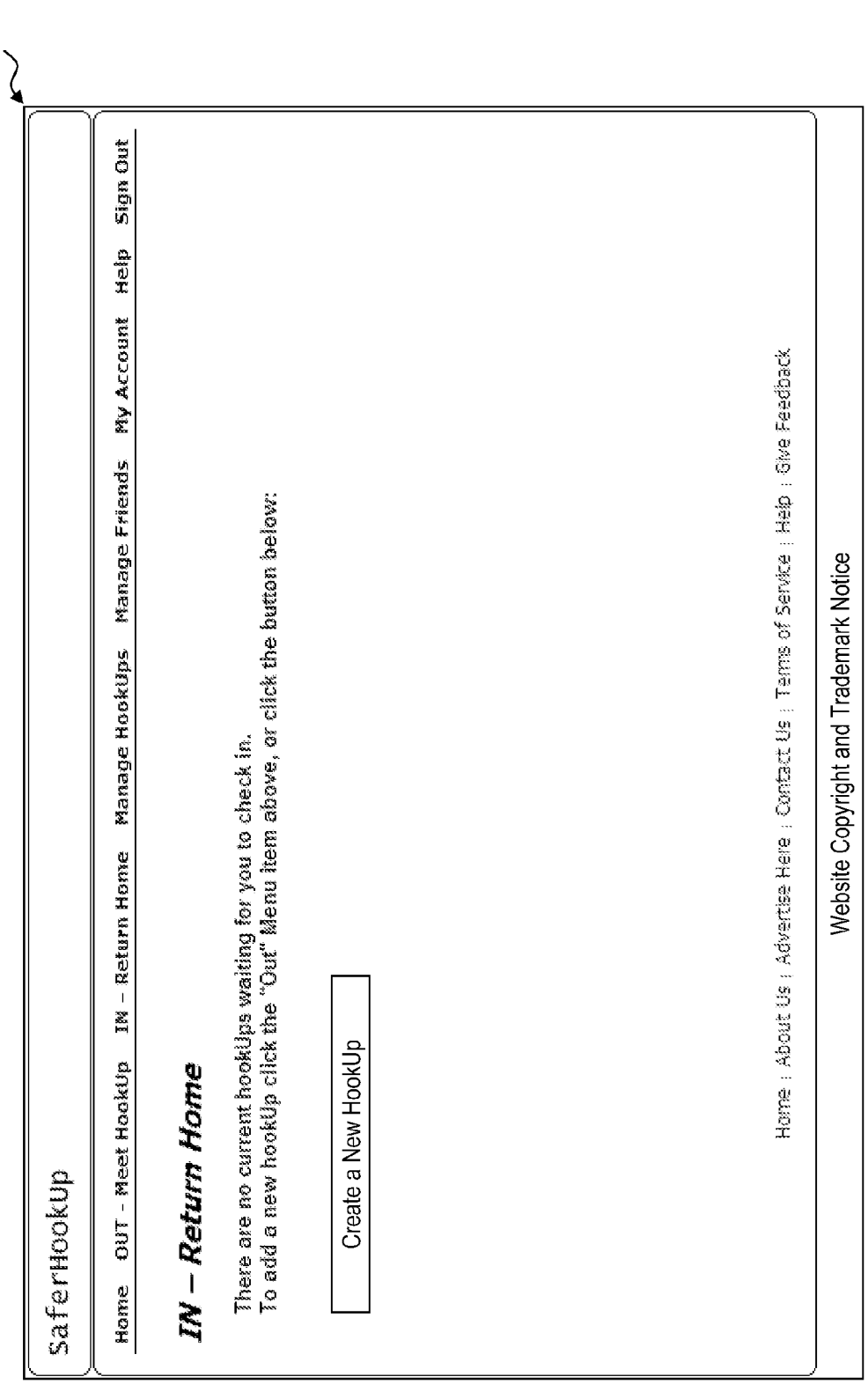
FIG. 14 is a screen shot of an IN—RETURN HOME PAGE—NO CURRENT REGISTERED HOOKUPS screen 1400 of some embodiments.

FIG. 14 is a screen shot of an IN—RETURN HOME PAGE—NO CURRENT REGISTERED HOOKUPS screen 1400 of some embodiments. This figure illustrates the condition where a Client does not have any active Hookups currently armed. A mechanism is illustrated whereby the Client may initiate the process to start a Hookup.

Figure 15:
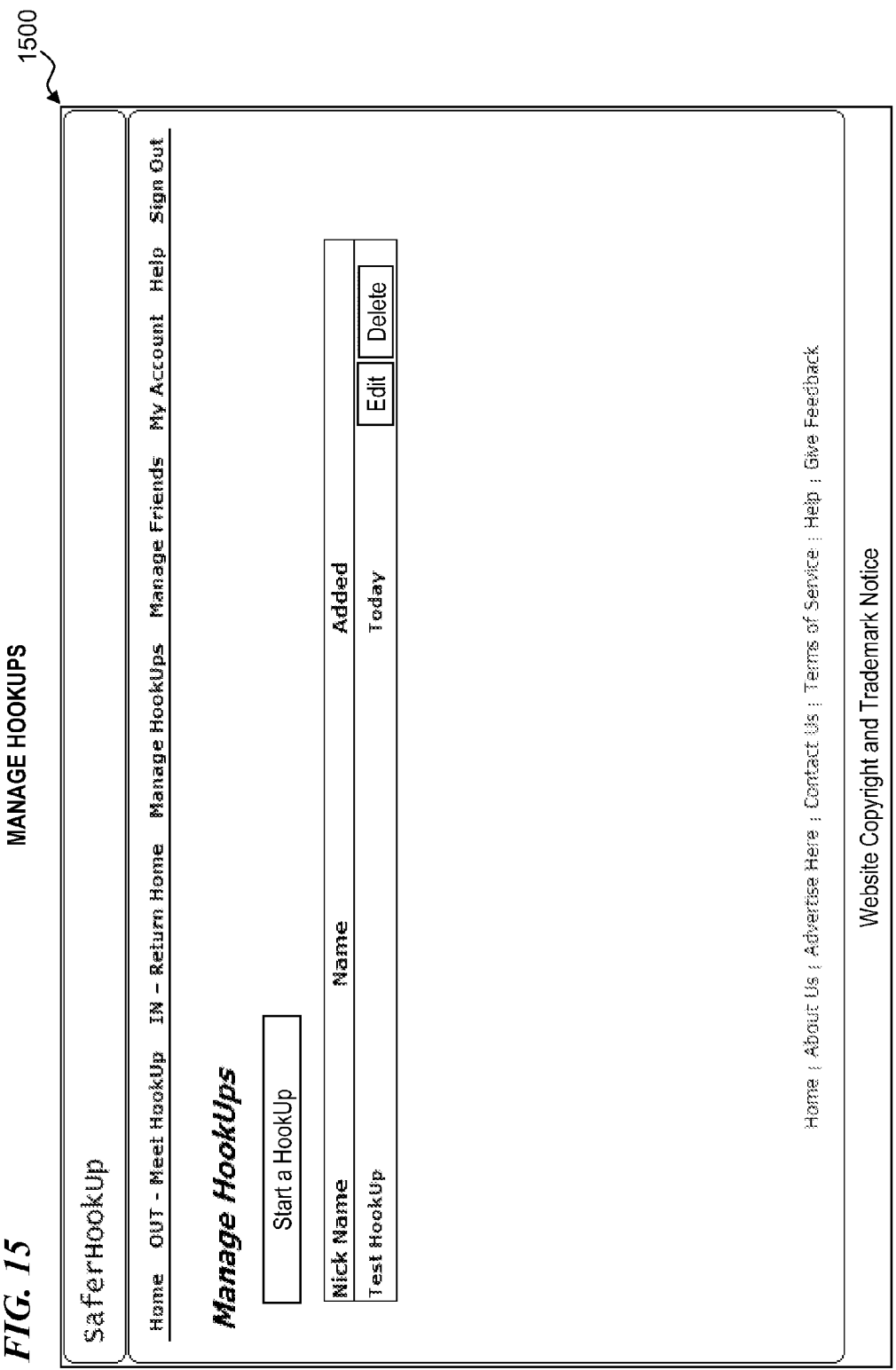
FIG. 15 is a screen shot of a MANAGE HOOKUPS screen 1500 of some embodiments.

FIG. 15 is a screen shot of a MANAGE HOOKUPS screen 1500 of some embodiments demonstrating the mechanism used by Clients to delete and edit existing Partner data. Each existing Partner is enumerated in a table. Further, a mechanism is illustrated whereby the Client may initiate the process to start a Hookup.

FIG. 16 is a screen shot of an EDIT EXISTING HOOKUP screen 1600 of some embodiments illustrating the information elicited by the website system regarding a Partner and further demonstrates the mechanism for Clients to make changes to update a Partner's data.

FIG. 17 is a screen shot of an OUT—MEET HOOKUP PAGE—PREVIOUS HOOKUP screen 1700 of some embodiments showing the first step of the Trigger process that elicits information from the Client regarding the type of Hookup. A mechanism is illustrated that allows the Client to quickly indicate the future Hookup is with a previous Partner, thus saving time from having to reenter information. Another mechanism is demonstrated to cancel the Hookup Trigger at this step in the arming process. This figure specifically illustrates the Client activating a Hookup with an existing Partner.

Figure 18:
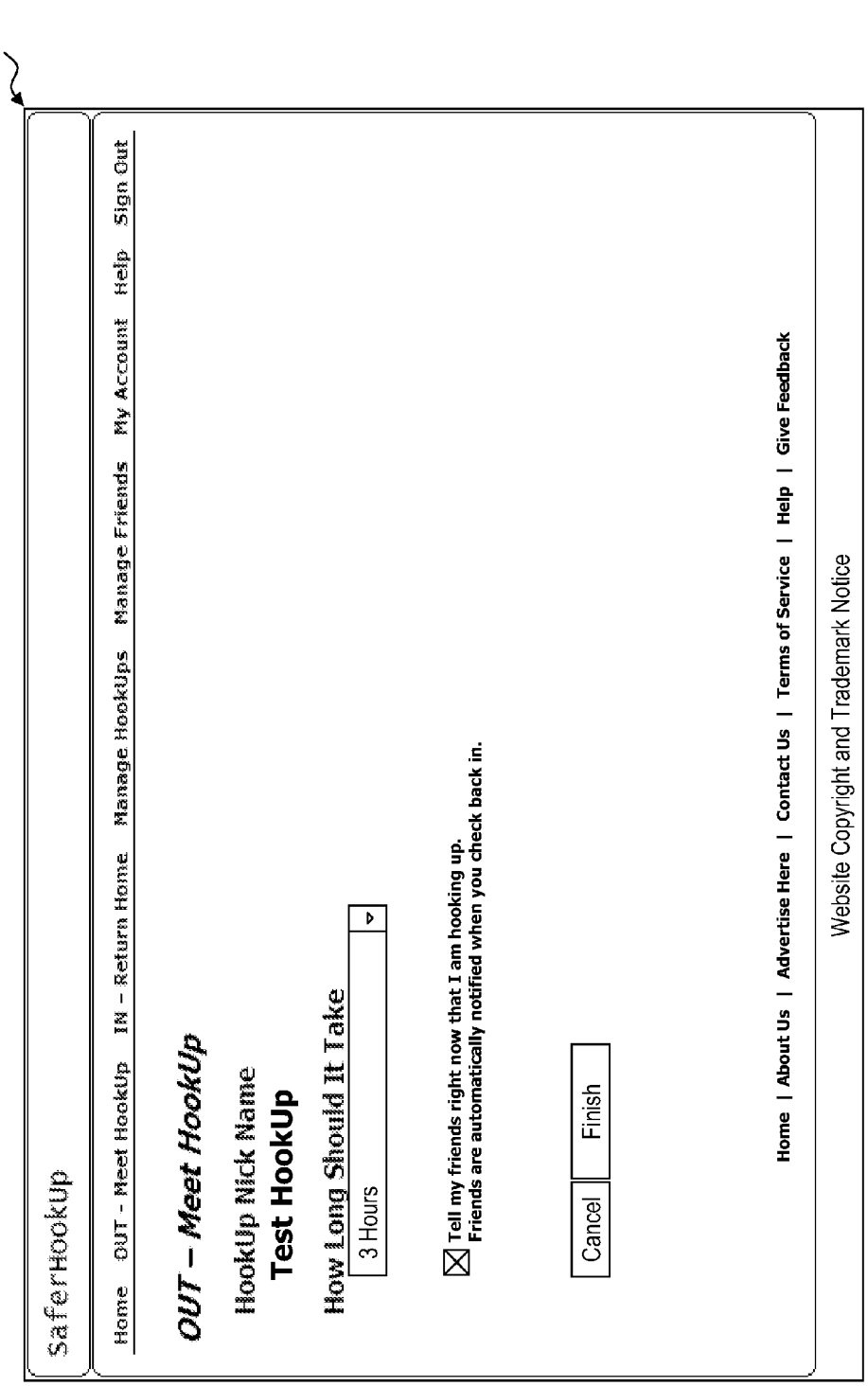
FIG. 18 is a screen shot of an OUT—MEET HOOKUP PAGE—NEW HOOKUP DURATION screen 1800 of some embodiments.

FIG. 18 is a screen shot of an OUT—MEET HOOKUP PAGE—NEW HOOKUP DURATION screen 1800 of some embodiments is another illustration demonstrating the next step in the arming process utilized by the Client when hooking up with an existing Partner. The length of the Hookup is elicited from the Client. The mechanism is similar to the method demonstrated in FIG. 11.

Figure 19:
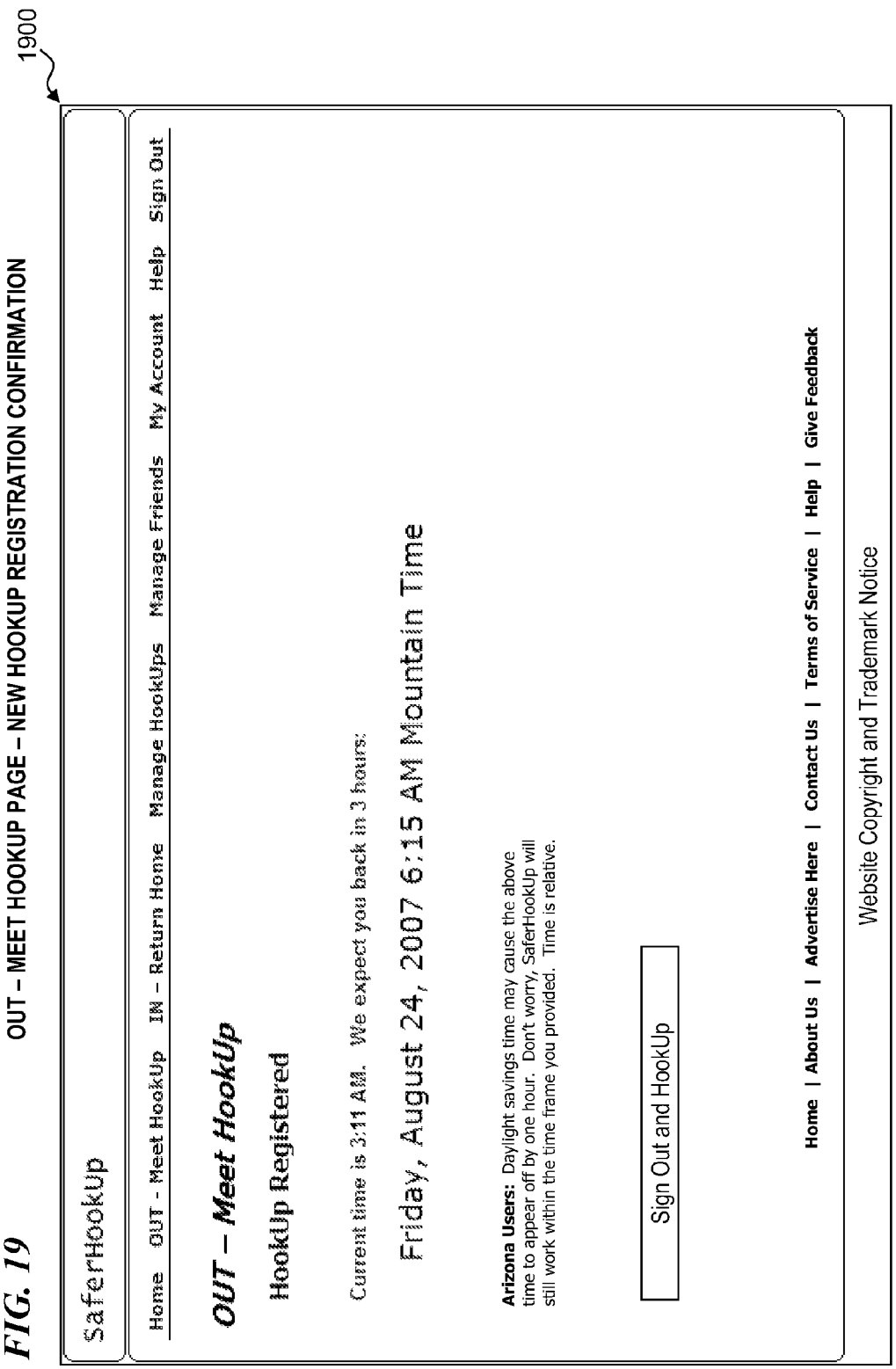
FIG. 19 is a screen shot of an OUT—MEET HOOKUP PAGE—NEW HOOKUP REGISTRATION CONFIRMATION screen 1900 of some embodiments.

FIG. 19 is a screen shot of an OUT—MEET HOOKUP PAGE—NEW HOOKUP REGISTRATION CONFIRMATION screen 1900 of some embodiments. This website page illustrates the final confirmation page in the Hookup arming process by presenting the Client with a summary of the Hookup details when a Client is hooking up with a previous Partner. A mechanism is illustrated that allows the Client to click a button to sign out of the website. Once the Sign Out button is clicked the website system redirects the client to the SIGN IN page shown above in FIG. 4.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A computerized method for automatic sending of a first communication alert to a first destination, after a client arranges a near future meeting with a first partner, the method comprising:

eliciting and receiving, into a server, first identifying information about the first partner, the first identifying information including a name and an address, wherein the address includes at least one selected from the group consisting of an electronic address of the first partner and a physical address of the first partner;

eliciting and receiving, into the server, triggering information from the client, wherein the triggering information includes specifications of the first communication alert to be sent, the first destination for the first communication alert, and a first triggering event for sending the first communication alert, and wherein the first triggering event is selected from the group consisting of: elapse of a first amount of time, receipt of a communication from the client, and receipt of a sensor signal from a sensor;

receiving arming information from the client and arming the sending of the first communication alert to be sent based on the triggering information;

receiving disarming information from the client, and disabling the sending of the first communication alert based on the disarming information; and conditionally sending the first communication alert and the first identifying information about the first partner from the server to the first destination based on:

an occurrence of the first triggering event after the receiving of the arming information from the client and the arming of the sending of the first communication alert, and not yet having received the disarming information.

2. The method of claim 1, wherein the receiving of first identifying information and the receiving of triggering information occurs within a first information transfer from the client to the server, and wherein the receiving of arming information also occurs within the first information transfer.

3. The method of claim 1, wherein:

the eliciting and receiving of the specification of the first destination for the first communication alert includes eliciting and receiving an electronic address of a first communications device of a first person;

the eliciting and receiving of the specification of the first triggering event includes eliciting and receiving information that defines the first amount of time;

the receiving of arming information includes receiving check-out information from the client and the arming includes starting a timer that triggers upon the elapse of the first amount of time; and the sending of the first communication alert to the first destination is based on the elapse of the first amount of time occurring before the disarming information is received from the client.

4. The method of claim 3, wherein the eliciting and receiving of the specification of the first destination for the first communication alert further includes eliciting and receiving an approval response from the first person having the first communications device, wherein the eliciting and receiving of the approval response includes receiving contact opt-out information from the first person if they are not interested in participating, and wherein the method further includes:

notifying the client that opt-out information for the first destination was received.

5. The method of claim 3, further comprising:
receiving rearming information from the client; and
extending the first amount of time for the triggering of the timer based on the rearming information.

6. The method of claim 1, wherein the eliciting and receiving of triggering information further includes eliciting and receiving client payment information, and charging an amount to an account based on the client payment information.

7. The computerized method of claim 1, wherein the first identifying information includes
known descriptive physical stats of the first partner.

8. The computerized method of claim 7, wherein the first identifying information includes a chat log of internet communications between the first partner and the client.

9. The computerized method of claim 1, wherein the first identifying information includes
known descriptive physical stats of the first partner, wherein
the arming information includes starting a timer that triggers upon the elapse of the first amount of time, wherein the sending of the first communication alert and the first identifying information about the first partner is based on the elapse of the first amount of time occurring before the disarming information is received from the client, and wherein the first destination for the first communication includes an emergency first-responder.

10. The computerized method of claim 1, further comprising providing a remote-control device configured to perform a plurality of departure functions via a single click on the remote-control device including sending the arming information from the client to the server.

11. The computerized method of claim 10, wherein the plurality of departure functions further include closing a garage door, turning off lights of a residence, changing temperature settings of an air conditioning system, and arming a security system.

12. The computerized method of claim 1, further comprising providing a remote-control device configured to perform a plurality of return-arrival functions via a single click on the remote-control device including sending the disarming information from the client to the server.

13. The computerized method of claim 12, wherein the plurality of return-arrival functions further include closing the garage door, turning on the lights of the residence, resetting the temperature settings of the air conditioning system, and disarming a security system.

14. The computerized method of claim 1, further comprising providing a remote-control device configured to perform a plurality of departure functions via a first single click on the remote-control device including sending the arming information from the client to the server, closing a garage door, turning off lights of a residence, changing temperature settings of an air conditioning system, and arming a security system, wherein the remote-control device is further configured to perform a plurality of return-arrival functions via a second single click on the remote-control device including sending the disarming information from the client to the server, closing the garage door, turning on the lights of the residence, resetting the temperature settings of the air conditioning system, and disarming a security system.

15. A computerized method for automatic remote notification comprising:

eliciting and receiving, into a server, triggering information from a client, wherein the triggering information includes specifications of a first communication to be sent, a first destination for the first communication, and a first triggering event for sending the first communication;

receiving arming information from the client and arming the sending of the first communication to be sent based on the triggering information; and conditionally sending the first communication from the server to the first destination based on an occurrence of the first triggering event, wherein:

the specification of the first destination for the first communication includes an electronic address of a first communications device of a first person such that the first person will receive the first communication via the first communications device;

the specification of the first communication includes an identification of a second person whom the client is to meet for a date;

the specification of the first triggering event includes information that defines a first amount of time for the date;

the receiving of arming information includes receiving check-out information from the client and the arming includes enabling sending of the first communication upon an elapse of the first amount of time; and the sending of the first communication to the first destination is based on the elapse of the first amount of time occurring before check-in information is received from the client, and wherein the method further comprises:
receiving rearming information from the client;
extending the first amount of time based on the rearming information;
receiving check-in information from the client; and
disabling the sending of the first communication based on the check-in information.

16. A computerized method for automatic remote notification comprising:

eliciting and receiving, into a server, triggering information from a client, wherein the triggering information includes specifications of a first communication to be sent, a first destination for the first communication, and a first triggering event for sending the first communication;

receiving arming information from the client and arming the sending of the first communication to be sent based on the triggering information; and conditionally sending the first communication from the server to the first destination based on an occurrence of the first triggering event, wherein:

the triggering information includes specifications of:
- a plurality of communications to be sent including the first communication and a second communication, wherein the specification of the first communication includes an identification of a second person whom the client is to meet for a date and the specification of the second communication also includes an identification of the second person whom the client is to meet for the date;
- a plurality of destinations including the first destination for the first communication and a second destination for the second communication, wherein the specification of the first destination for the first communication includes an electronic address of a first communications device of a first person, such that the first person will receive the first communication via the first communications device, and the specification of the second destination for the second communication includes an electronic address of a second communications device of a third person, such that the third person will receive the second communication via the second communications device; and
- a plurality of triggering events including the first triggering event for sending the first communication and a second triggering event for sending the second communication, wherein the specification of the first triggering event includes information that defines a first amount of time that must elapse before sending the first communication, and wherein the specification of the second triggering event includes information that defines a second amount of time that must elapse before sending the second communication;

the receiving of arming information includes receiving check-out information from the client and enabling both sending of the first communication to the first destination upon an elapse of the first amount of time and sending of the second communication to the second destination upon an elapse of the second amount of time based on the check-out information; and wherein the method further comprises:
  receiving disarming information from the client, and disabling both sending of the first communication and sending of the second communication based on the disarming information,
    wherein the sending of the first communication to the first destination is based on elapse of the first amount of time occurring before disarming information is received from the client; and
    wherein the sending of the second communication to the second destination is based on elapse of the second amount of time occurring before disarming information is received from the client.

17. An apparatus for automatic sending of a first communication alert to a first destination, after a client arranges a near future meeting with a first partner, the apparatus comprising:
- a server, wherein the server is operatively coupled to an internet;
- an information database operatively coupled to the server;
- an identifier module operatively coupled to the information database, wherein the identifier module is configured to elicit and receive first identification information about the first partner from the client over the internet, wherein the identifier module is configured to store the first identification information to the information database, wherein the first identification information includes a name and an address, and wherein the address includes at least one selected from the group consisting of an electronic address of the first partner and a physical address of the first partner;
- a trigger module operatively coupled to the information database, wherein the trigger module is configured to elicit and receive triggering information from a client over the internet, wherein the trigger module is configured to store the triggering information to the information database, wherein the triggering information includes specifications of a first communication alert to be sent, a first destination for the first communication alert, and a first triggering event for sending the first communication alert, and wherein the first triggering event is selected from the group consisting of: elapse of a first amount of time, receipt of a communication from the client, and receipt of a sensor signal from a sensor;
- an arm module operatively coupled to the information database, wherein the arm module is configured to receive arming information related to the triggering information from the client, wherein the arm module is configured to store the received arming information to the information database, wherein the arm module is configured to arm the sending of the first communication alert to be sent based on the triggering information, wherein the arm module is configured to receive disarming information, wherein the arm module is configured to store the received disarming information to the information database, and wherein the arm module is configured to disable the sending of the first communication alert based on the disarming information; and
- a communications unit operatively coupled to the information database, wherein the communications unit is configured to conditionally send the first communication alert and the first identification information from the server to the first destination based on:
  - an occurrence of the first triggering event after the arm module receives the arming information from the client and arms the sending of the first communication alert, and
  - the arm module not yet having received the disarming information.

18. The apparatus of claim 17, wherein the identifier module is configured to receive the first identification information and the trigger module is configured to receive the triggering information within a first information transfer from the client to the server, and wherein the arm module is also configured to receive the arming information within the first information transfer.

19. The apparatus of claim 17, wherein:
the specification of the first destination for the first communication alert includes an electronic address of a first communications device of a first person;
the specification of the first triggering event includes information that defines the first amount of time;
the arming information includes check-out information from the client and the arm module is configured to start a timer that triggers upon the elapse of the first amount of time; and
the communications unit is configured to send the first communication alert to the first destination based on the elapse of the first amount of time occurring before the disarming information is received from the client.

20. The apparatus of claim 19, wherein the specification of the first destination for the first communication alert further includes an approval response from the first person having the first communications device, wherein the approval response includes contact opt-out information from the first person if they are not interested in participating, and wherein the communications unit is configured to notify the client that opt-out information for the first destination was received.

21. The apparatus of claim 19, wherein the arm module is configured to receive rearming information from the client, and wherein the arm module is configured to extend the first amount of time to an extended first amount of time based on the rearming information such that the timer is configured to trigger upon an elapse of the extended first amount of time.

22. The apparatus of claim 19, wherein the arm module is configured to disable the timer after the arm module receives the disarming information such that the communications unit cannot send the first communication.

23. The apparatus of claim 17, wherein the triggering information includes client payment information, and wherein the trigger module is configured to charge an amount to an account based on the client payment information.

24. An apparatus for automatic remote notification comprising:
- a server, wherein the server is operatively coupled to an internet;
- an information database operatively coupled to the server;
- a trigger module operatively coupled to the information database, wherein the trigger module is configured to elicit and receive triggering information from a client over the internet, wherein the trigger module is configured to store the triggering information to the information database, and wherein the triggering information includes specifications of a first communication to be sent, a first destination for the first communication, and a first triggering event for sending the first communication;
- an arm module operatively coupled to the information database, wherein the arm module is configured to receive arming information related to the triggering information from the client, wherein the arm module is configured to store the received arming information to the information database, and wherein the arm module is configured to arm the sending of the first communication to be sent based on the triggering information; and
- a communications unit operatively coupled to the information database, wherein the communications unit is configured to conditionally send the first communication from the server to the first destination based on occurrence of the first triggering event, wherein:
  - the specification of the first destination for the first communication includes an electronic address of a first communications device of a first person, such that the first person will receive the first communication via the first communications device;
  - the specification of the first communication includes an identification of a second person whom the client is to meet for a date;
  - the specification of the first triggering event includes information that defines a first amount of time for the date;
  - the arming information includes check-out information from the client and the arm module is configured to enable sending of the first communication upon an elapse of the first amount of time;
  - the communications unit is configured to send the first communication to the first destination based on the elapse of the first amount of time occurring before check-in information is received from the client;
  - the arm module is configured to receive rearming information from the client and the arm module is configured to extend the first amount of time based on the rearming information; and
  - the arm module is configured to receive check-in information from the client and the arm module is configured to disable the sending of the first communication based on the check-in information.

25. An apparatus for automatic remote notification comprising:
- a server, wherein the server is operatively coupled to an internet;
- an information database operatively coupled to the server;
- a trigger module operatively coupled to the information database, wherein the trigger module is configured to elicit and receive triggering information from a client over the internet, wherein the trigger module is configured to store the triggering information to the information database, and wherein the triggering information includes specifications of a first communication to be sent, a first destination for the first communication, and a first triggering event for sending the first communication;
- an arm module operatively coupled to the information database, wherein the arm module is configured to receive arming information related to the triggering information from the client, wherein the arm module is configured to store the received arming information to the information database, and wherein the arm module is configured to arm the sending of the first communication to be sent based on the triggering information; and
- a communications unit operatively coupled to the information database, wherein the communications unit is configured to conditionally send the first communication from the server to the first destination based on occurrence of the first triggering event, wherein:
  - the triggering information includes specifications of:
    - a plurality of communications to be sent including the first communication and a second communication, wherein the specification of the first communication includes an identification of a second person whom the client is to meet for a date and the specification of the second communication also includes an identification of the second person whom the client is to meet for the date;
    - a plurality of destinations including the first destination for the first communication and a second destination for the second communication, wherein the specification of the first destination for the first communication includes an electronic address of a first communications device of a first person, such that the first person will receive the first communication via the first communications device, and the specification of the second destination for the second communication includes an electronic address of a second communications device of a third person, such that the third person will receive the second communication via the second communications device; and
    - a plurality of triggering events including the first triggering event for sending the first communication and a second triggering event for sending the second communication, wherein the specification of the first triggering event includes information that defines a first amount of time that must elapse before sending the first communication, and wherein the specification of the second triggering event includes information that defines a second amount of time that must elapse before sending the second communication;

the arm module is configured to enable, upon receipt of check-out information from the client, both sending of the first communication to the first destination upon an elapse of the first amount of time and sending of the second communication to the second destination upon an elapse of the second amount of time based on the check-out information;

the arm module is configured to disable, upon receipt of disarming information from the client, both sending of the first communication and sending of the second communication based on the disarming information, wherein:

the communications unit is configured to send the first communication to the first destination based on elapse of the first amount of time occurring before disarming information is received from the client; and the communications unit is configured to send the second communication to the second destination based on elapse of the second amount of time occurring before disarming information is received from the client.

26. A non-transitory computer-readable medium having computer-executable instructions stored thereon for causing a suitably-programmed information processor to perform a method for automatic sending of a first communication alert to a first destination, after a client arranges a near future meeting with a first partner, the method comprising:

eliciting and receiving, into a server, first identifying information about the first partner, the first identifying information including a name and an address, wherein the address includes at least one selected from the group consisting of an electronic address of the first partner and a physical address of the first partner;

eliciting and receiving, into the server, triggering information from the client, wherein the triggering information includes specifications of the first communication alert to be sent, the first destination for the first communication alert, and a first triggering event for sending the first communication alert, and wherein the first triggering event is selected from the group consisting of: elapse of a first amount of time, receipt of a communication from the client, and receipt of a sensor signal from a sensor;

receiving arming information from the client and arming the sending of the first communication alert to be sent based on the triggering information;

receiving disarming information from the client, and disabling the sending of the first communication alert based on the disarming information; and conditionally sending the first communication alert and the first identifying information about the first partner from the server to the first destination based on:

an occurrence of the first triggering event after the receiving of the arming information from the client and the arming of the sending of the first communication alert, and not yet having received the disarming information.

27. The non-transitory computer-readable medium of claim 26, wherein the medium further comprises instructions such that the receiving of first identifying information and the receiving of triggering information occurs within a first information transfer from the client to the server, and wherein the receiving of arming information also occurs within the first information transfer.

28. The non-transitory computer-readable medium of claim 26, wherein the medium further comprises instructions such that:

the eliciting and receiving of the specification of the first destination for the first communication alert includes eliciting and receiving an electronic address of a first communications device of a first person;

the eliciting and receiving of the specification of the first triggering event includes eliciting and receiving information that defines the first amount of time;

the receiving of arming information includes receiving check-out information from the client and the arming includes starting a timer that triggers upon the elapse of the first amount of time; and the sending of the first communication alert to the first destination is based on the elapse of the first amount of time occurring before the disarming information is received from the client.

29. The non-transitory computer-readable medium of claim 28, wherein the medium further comprises instructions such that the eliciting and receiving of the specification of the first destination for the first communication alert further includes eliciting and receiving an approval response from the first person having the first communications device, wherein the eliciting and receiving of the approval response includes receiving contact opt-out information from the first person if they are not interested in participating, and wherein the medium further comprises instructions to cause the method to include notifying the client that opt-out information for the first destination was received.

30. The non-transitory computer-readable medium of claim 28, wherein the medium further comprises instructions to cause the method to include:

receiving rearming information from the client; and extending the first amount of time for the triggering of the timer based on the rearming information.

31. A non-transitory computer-readable medium having computer-executable instructions stored thereon for causing a suitably-programmed information processor to perform a method comprising:

eliciting and receiving, into a server, triggering information from a client, wherein the triggering information includes specifications of a first communication to be sent, a first destination for the first communication, and a first triggering event for sending the first communication;

receiving arming information from the client and arming the sending of the first communication to be sent based on the triggering information; and conditionally sending the first communication from the server to the first destination based on occurrence of the first triggering event, wherein the medium further comprises instructions such that:

the specification of the first destination for the first communication includes an electronic address of a first communications device of a first person such that the first person will receive the first communication via the first communications device;

the specification of the first communication includes an identification of a second person whom the client is to meet for a date;

the specification of the first triggering event includes information that defines a first amount of time for the date;

the receiving of arming information includes receiving check-out information from the client and the arming includes enabling sending of the first communication upon an elapse of the first amount of time; and the sending of the first communication to the first destination is based on the elapse of the first amount of time occurring before check-in information is received from the client, and wherein the medium further comprises instructions to cause the method to include:

receiving rearming information from the client;

extending the first amount of time based on the rearming information;

receiving check-in information from the client; and disabling the sending of the first communication based on the check-in information.

32. A non-transitory computer-readable medium having computer-executable instructions stored thereon for causing a suitably-programmed information processor to perform a method comprising:

eliciting and receiving, into a server, triggering information from a client, wherein the triggering information includes specifications of a first communication to be sent, a first destination for the first communication, and a first triggering event for sending the first communication;

receiving arming information from the client and arming the sending of the first communication to be sent based on the triggering information; and conditionally sending the first communication from the server to the first destination based on occurrence of the first triggering event, wherein the medium further comprises instructions such that the triggering information includes specifications of:

a plurality of communications to be sent including the first communication and a second communication, wherein the specification of the first communication includes an identification of a second person whom the client is to meet for a date and the specification of the second communication also includes an identification of the second person whom the client is to meet for the date;

a plurality of destinations including the first destination for the first communication and a second destination for the second communication, wherein the specification of the first destination for the first communication includes an electronic address of a first communications device of a first person, such that—the first person will receive the first communication via the first communications device, and the specification of the second destination for the second communication includes an electronic address of a second communications device of a third person, such that the third person will receive the second communication via the second communications device; and a plurality of triggering events including the first triggering event for sending the first communication and a second triggering event for sending the second communication, wherein the specification of the first triggering event includes information that defines a first amount of time that must elapse before sending the first communication, and wherein the specification of the second triggering event includes information that defines a second amount of time that must elapse before sending the second communication;

the receiving of arming information includes receiving check-out information from the client and enabling both sending of the first communication to the first destination upon an elapse of the first amount of time and sending of the second communication to the second destination upon an elapse of the second amount of time based on the check-out information, and wherein the medium further comprises instructions to cause the method to include:

receiving disarming information from the client, and disabling both sending of the first communication and sending of the second communication based on the disarming information, wherein the sending of the first communication to the first destination is based on elapse of the first amount of time occurring before disarming information is received from the client; and wherein the sending of the second communication to the second destination is based on elapse of the second amount of time occurring before disarming information is received from the client.

* * * * *